US012558670B2

(12) United States Patent
Park et al.

(10) Patent No.: US 12,558,670 B2
(45) Date of Patent: Feb. 24, 2026

(54) SUPER ABSORBENT POLYMER

(71) Applicant: LG Chem, Ltd., Seoul (KR)

(72) Inventors: Sung Soo Park, Daejeon (KR); Hee Chang Woo, Daejeon (KR); Jun Wye Lee, Daejeon (KR); Kwang In Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 19/041,418

(22) Filed: Jan. 30, 2025

(65) Prior Publication Data

US 2025/0296072 A1 Sep. 25, 2025

(30) Foreign Application Priority Data

Mar. 20, 2024 (KR) ........................ 10-2024-0038728

(51) Int. Cl.

*B01J 20/26* (2006.01)
*B01J 20/28* (2006.01)
*C08F 220/06* (2006.01)

(52) U.S. Cl.

CPC ....... *B01J 20/267* (2013.01); *B01J 20/28004* (2013.01); *B01J 20/28011* (2013.01); *B01J 20/28016* (2013.01); *C08F 220/06* (2013.01); *C08F 2810/20* (2013.01)

(58) Field of Classification Search

CPC ........... B01J 20/28016; B01J 20/28019; C08F 220/06

See application file for complete search history.

(56) References Cited

U.S. PATENT DOCUMENTS

| | | | |
|---|---|---|---|
| 5,338,766 | A | 8/1994 | Phan et al. |
| 6,319,558 | B1 | 11/2001 | Willemsen |
| 10,994,260 | B2 | 5/2021 | Kovacic et al. |
| 2005/0003191 | A1 | 1/2005 | Ehrnsperger et al. |
| 2005/0239942 | A1 | 10/2005 | Herfert et al. |
| 2006/0020053 | A1 | 1/2006 | Flohr et al. |
| 2007/0264489 | A1 | 11/2007 | Sasabe et al. |
| 2008/0021150 | A1 | 1/2008 | Becker et al. |

(Continued)

FOREIGN PATENT DOCUMENTS

| | | | |
|---|---|---|---|
| CN | 001136355 | C | 1/2004 |
| EP | 3270857 | B1 | 12/2019 |

(Continued)

OTHER PUBLICATIONS https://polymersco.com/product/hygiene-grade-super-absorbent-polymer/.*

(Continued)

*Primary Examiner* — Vu A Nguyen

(74) *Attorney, Agent, or Firm* — Lerner David LLP

(57) ABSTRACT

A super absorbent polymer may exhibit improved absorption rate and absorption performance. The super absorbent polymer may be a polyacrylic acid or salt thereof-based super absorbent polymer. The superabsorbent polymer may have a value F1 from 0.55 to 0.65 calculated by Equation 1: $F1=K1(0.5)\times[\{(A(CRC)^{0.1}\times C(Convexity)\times D(Circularity)^{0.5})\}/(B(Aspect\ ratio)^{0.3})]$. The superabsorbent polymer may have a value F2 from 0.65 to 0.75 calculated by Equation 2: $F2=K2\times[(B^{0.2})/\{(A^{0.1}\times C\times D^{0.5})\}]$. The variables included in Equations 1 and 2 are described in detail in the disclosure.

8 Claims, 6 Drawing Sheets

(56) References Cited

U.S. PATENT DOCUMENTS

| | | | |
|---|---|---|---|
| 2008/0075937 A1 | 3/2008 | Wada et al. | |
| 2008/0140037 A1 | 6/2008 | Newman | |
| 2012/0220452 A1 | 8/2012 | Matsumoto et al. | |
| 2013/0026412 A1 | 1/2013 | Machida et al. | |
| 2013/0102750 A1 | 4/2013 | Watanabe et al. | |
| 2013/0136713 A1 | 5/2013 | Terada et al. | |
| 2013/0175473 A1 | 7/2013 | Wada et al. | |
| 2014/0031203 A1 | 1/2014 | Kondo et al. | |
| 2014/0031473 A1 | 1/2014 | Nogi et al. | |
| 2015/0299404 A1 | 10/2015 | Daniel et al. | |
| 2015/0307681 A1 | 10/2015 | Park et al. | |
| 2016/0208035 A1 | 7/2016 | Ryu et al. | |
| 2017/0014801 A1 | 1/2017 | Ikeuchi et al. | |
| 2017/0073478 A1 | 3/2017 | Joo et al. | |
| 2017/0189575 A1 | 7/2017 | Lee et al. | |
| 2017/0216817 A1 | 8/2017 | Torii et al. | |
| 2017/0233534 A1 | 8/2017 | Kim et al. | |
| 2017/0312148 A1 | 11/2017 | Dobrosielska-Oura et al. | |
| 2018/0021437 A1 | 1/2018 | Kim et al. | |
| 2018/0037686 A1 | 2/2018 | Lee et al. | |
| 2018/0243464 A1 | 8/2018 | Hwang et al. | |
| 2019/0099739 A1 | 4/2019 | Lee et al. | |
| 2019/0344243 A1 | 11/2019 | Lee et al. | |
| 2020/0085716 A1 | 3/2020 | Mehling et al. | |
| 2020/0139344 A1 | 5/2020 | Kim et al. | |
| 2021/0033516 A1 | 2/2021 | Toennessen et al. | |
| 2021/0040271 A1 | 2/2021 | Lee et al. | |
| 2021/0100684 A1 | 4/2021 | Kitabata et al. | |
| 2021/0113989 A1 | 4/2021 | Hur et al. | |
| 2021/0121852 A1 | 4/2021 | Herfert et al. | |
| 2021/0154637 A1 | 5/2021 | Pfeiffer et al. | |
| 2021/0244844 A1 | 8/2021 | Chan et al. | |
| 2021/0362126 A1 | 11/2021 | Bauer et al. | |
| 2022/0088568 A1 | 3/2022 | Kimura et al. | |
| 2023/0102961 A1 | 3/2023 | Nishimura et al. | |
| 2023/0338925 A1 | 10/2023 | Chung et al. | |
| 2023/0374232 A1* | 11/2023 | Ryu | C08K 5/098 |

FOREIGN PATENT DOCUMENTS

| | | | | |
|---|---|---|---|---|
| EP | 4137534 | A1 | 2/2023 | |
| EP | 4206244 | A1 | 7/2023 | |
| EP | 4253451 | A1 | 10/2023 | |
| EP | 4289871 | A1 | 12/2023 | |
| EP | 4321559 | A1 | 2/2024 | |
| JP | H08122284 | A | 5/1996 | |
| JP | 2001106728 | A | 4/2001 | |
| JP | 2002504568 | A | 2/2002 | |
| JP | 2005097569 | A | 4/2005 | |
| JP | 3745539 | B2 | 2/2006 | |
| JP | 2006527641 | A | 12/2006 | |
| JP | 2007512405 | A | 5/2007 | |
| JP | 2009057496 | A | 3/2009 | |
| JP | 4261853 | B2 | 4/2009 | |
| JP | 4284767 | B2 | 6/2009 | |
| JP | 4908545 | B2 | 4/2012 | |
| JP | 2012097273 | A | 5/2012 | |
| JP | WO 2012144564 | A1 | 7/2014 | |
| JP | 5616437 | B2 | 10/2014 | |
| JP | 5692844 | B2 | 4/2015 | |
| JP | 2015120933 | A | 7/2015 | |
| JP | 5913423 | B2 | 4/2016 | |
| JP | 2017185485 | A | 10/2017 | |
| JP | 2017531531 | A | 10/2017 | |
| JP | 2018510041 | A | 4/2018 | |
| JP | 2021510320 | A | 4/2021 | |
| JP | 6890190 | B2 | 6/2021 | |
| JP | 6950158 | B2 | 10/2021 | |
| JP | 6959030 | B2 | 11/2021 | |
| JP | 7181948 | B2 | 12/2022 | |
| JP | 7270828 | B2 | 5/2023 | |
| JP | 7362653 | B2 | 10/2023 | |
| KR | 100317398 | B1 | 11/2002 | |
| KR | 20050036974 | A | 4/2005 | |
| KR | 20070039050 | A | 4/2007 | |
| KR | 20070048226 | A | 5/2007 | |
| KR | 20070083761 | A | 8/2007 | |
| KR | 20130097771 | A | 9/2013 | |
| KR | 20140063116 | A | 5/2014 | |
| KR | 20150062959 | A | 6/2015 | |
| KR | 20150087368 | A | 7/2015 | |
| KR | 20150142636 | A | 12/2015 | |
| KR | 20150143181 | A | 12/2015 | |
| KR | 20160127742 | A | 11/2016 | |
| KR | 101700354 | B1 | 1/2017 | |
| KR | 20170020113 | A | 2/2017 | |
| KR | 20170033634 | A | 3/2017 | |
| KR | 20170063818 | A | 6/2017 | |
| KR | 20170111295 | A | 10/2017 | |
| KR | 101812895 | B1 | 12/2017 | |
| KR | 101848470 | B1 | 4/2018 | |
| KR | 20180073334 | A | 7/2018 | |
| KR | 20180074384 | A | 7/2018 | |
| KR | 101908142 | B1 | 10/2018 | |
| KR | 101918647 | B1 | 11/2018 | |
| KR | 20190012809 | A | 2/2019 | |
| KR | 20190016534 | A | 2/2019 | |
| KR | 101989142 | B1 | 6/2019 | |
| KR | 20190072406 | A | 6/2019 | |
| KR | 102094453 | B1 | 3/2020 | |
| KR | 20200051565 | A | 5/2020 | |
| KR | 20200062012 | A | 6/2020 | |
| KR | 20200073044 | A | 6/2020 | |
| KR | 20200123127 | A | 10/2020 | |
| KR | 102322774 | B1 | 11/2021 | |
| KR | 20220046497 | A | 4/2022 | |
| KR | 20220049961 | A | 4/2022 | |
| KR | 20220068184 | A | 5/2022 | |
| KR | 20220088351 | A | 6/2022 | |
| KR | 20220169431 | A | 12/2022 | |
| KR | 20220169437 | A | 12/2022 | |
| KR | 20220169444 | A | 12/2022 | |
| KR | 102568226 | B1 | 8/2023 | |
| KR | 20230120110 | A | 8/2023 | |
| KR | 102578740 | B1 | 9/2023 | |
| KR | 102584470 | B1 | 10/2023 | |
| KR | 20240014710 | A | 2/2024 | |
| WO | WO-2022131838 | A1 * | 6/2022 | C08F 20/06 |
| WO | 2022265459 | A1 | 12/2022 | |
| WO | 2022265477 | A1 | 12/2022 | |

OTHER PUBLICATIONS

International Search Report for Application No. PCT/KR2024/018688 mailed Mar. 7, 2025. 5 pages (see p. 2-4, categorizing the cited references).

International Search Report for Application No. PCT/KR2024/018689 mailed Mar. 7, 2025. 5 pages (see p. 2-4, categorizing the cited references).

Zhang, Shuxin, et al., "Predicting the Swelling Behavior of Acrylic Superabsorbent Polymers Used in Diapers", Advances in Polymer Technology, Dec. 2021, pp. 1-7, vol. 2021.

Shi, Mingsheng, et al., "The Development of a Polysaccharide-Based Hydrogel Encapsulating Tobramycin-Loaded Gelatine Microspheres as an Antibacterial System", Gels 2023, Mar. 2023, pp. 1-15, vol. 9(3), No. 219.

International Search Report for Application No. PCT/KR2025/002375 mailed Jun. 2, 2025. 3 pages.

George Odian, "Principles of Polymerization" , Wiley-Interscience, Feb. 2004. 839 pages.

International Search Report for Application No. PCT/KR2025/002377 mailed May 26, 2025. 3 pages.

International Search Report for Application No. PCT/KR2025/095022 mailed Jul. 4, 2025. 3 pages.

Kim, Hae Chan, "Superabsorbent polymer with enhanced gel strength and heat resistance using itaconic acid-based oligomer", Polymers for Advanced Technologies, vol. 34, pp. 2564-2572, Apr. 25, 2023.

International Search Report for Application No. PCT/KR2025/005233 mailed Jul. 28, 2025. 3 pages (see p. 3 & 4, categorizing the cited references).

(56) References Cited

OTHER PUBLICATIONS

Menceloglu, Y., et al., "Triblock Superabsorbent Polymer Nanocomposites with Enhanced Water Retention Capacities and Rheological Characteristics", ACS Omega, vol. 7, Issue 24, pp. 20486-20494, Jun. 8, 2022.

International Search Report for Application No. PCT/KR2025/005235 mailed Jul. 22, 2025. 5 pages (see p. 3-5, categorizing the cited references).

International Search Report for Application No. PCT/KR2025/006016 dated Aug. 1, 2025 . 7 pages (see p. 3-7, categorizing the cited references).

International Search Report for Application No. PCT/KR2025/006021 dated Jul. 31, 2025 . 7 pages (see p. 3-7, categorizing the cited references).

International Search Report for Application No. PCT/KR2025/095303 dated Aug. 4, 2025 . 4 pages (see p. 3 & 4 categorizing the cited references).

Kim, S., et al. Preparation of Surface-Reinforced Superabsorbent Polymer Hydrogel Microspheres via Incorporation of In Situ Synthesized Silver Nanoparticles. Polymers. Mar. 2021; 13(6):902. https://doi.org/10.3390/polym13060902.11 pgs.

Situ, Y, et al., "Synthesis and application of super absorbent polymers synthesized with ammonia solution and diatomaceous earth with low toxic residues" Environmental Technology & Innovation, Oct. 2023, pp. 1-12, vol. 32.

Kwon, Y.R."Surface-crosslinking of itaconic acid-based superabsorbent polymer using a novel bio-based surface-crosslinker based on succinic acid" Polymer-Plastics Technology and Materials, Taylor & Francis, Mar. 2023, pp. 1057-1066, vol. 62, Issue 8.

Sharma, S. et al., "Superabsorbent Polymer Gels based on Polyaspartic Acid and Polyacrylic Acid" Journal of Material Science & Engineering, Feb. 2016, pp. 1-7, vol. 5, Issue 3.

International Search Report for Application No. PCT/KR2025/006678 mailed Aug. 29, 2025, 11 pages.

International Search Report for Application No. PCT/KR2025/006025 mailed Aug. 6, 2025, 13 pages.

International Search Report for Application No. PCT/KR2025/006542 mailed Aug. 27, 2025, 9 pages.

International Search Report for Application No. PCT/KR2025/006675 mailed Aug. 27, 2025, 9 pages.

* cited by examiner

SUPER ABSORBENT POLYMER

CROSS-REFERENCE TO RELATED APPLICATION

This application claims priority to Korean Patent Application No. 10-2024-0038728 filed on Mar. 20, 2024 and all the benefits accruing therefrom under 35 U.S.C. § 119, the contents of which are incorporated by reference in their entirety.

BACKGROUND

The present disclosure relates to a super absorbent polymer. More specifically, the present disclosure relates to a super absorbent polymer exhibiting improvement in absorption rate and absorption performance.

A super absorbent polymer (SAP) is a synthetic polymer material which has the ability capable of absorbing moisture 500 times to 1,000 times its own weight, and is given different names, such as a super absorbency material (SAM) and an absorbent gel material (AGM), by each developer. The above-described super absorbent polymer was first put into practical use in diapers, hygiene products, and the like, and is now widely used as a material for soil repair agents for horticulture, a civil engineering work, a construction index material, a seedling sheet, a freshness maintaining agent in a food distribution field, and a fomentation.

The super absorbent polymer is widely used in the field of hygiene products such as diapers or sanitary napkins. In the hygiene product, the super absorbent polymer is generally included in a dispersed state in a pulp. However, in recent years, efforts have been made to provide sanitary products such as thinner diapers, and as part of the efforts, development of products with a reduced content of pulps, or furthermore, with no pulps, such as so-called pulpless diapers, is actively in progress.

As described above, in the case of a hygiene product with a reduced content of pulps or with no pulps, a super absorbent polymer is contained in a relatively high proportion, so that super absorbent polymer particles are inevitably included in multiple layers in the hygiene product. In order for the total super absorbent polymer particles included in multiple layers to absorb a large amount of liquid such as urine more efficiently, the super absorbent polymer is required to exhibit not only high absorption performance but also quick vortex time. Meanwhile, the most general method for increasing the above-described absorption properties may be a method for forming a porous structure inside a super absorbent polymer, thereby widening the surface area of the super absorbent polymer, and in order to widen the surface area of the super absorbent polymer, a method for forming a porous structure inside base polymer powder by including a foaming agent in a monomer composition and performing cross-linking polymerization is generally adopted.

However, there is a disadvantage in that overall physical properties of the super absorbent polymer, for example, surface tension, permeability, volume density, and the like are degraded due to the use of the foaming agent, and the amount of generated fine powder increases, and accordingly, there has been a continuous demand for the development of a technology capable of improving absorption properties of a super absorbent polymer without the use of a foaming agent.

Accordingly, in order to fundamentally solve the above-described problem, there has been a continuous demand for the development of technology capable of producing a super absorbent polymer without generating fine powder.

SUMMARY

The present disclosure is to provide a super absorbent polymer capable of implementing excellent quality when the corresponding polymer is applied to an actual product by identifying the relationship between absorption properties of the super absorbent polymer and the particle shape thereof to adjust factor values F1 and F2, which represent the relationship between centrifuge retention capacity (CRC), aspect ratio (A/R), convexity, and circularity, to predetermined values, thereby improving an absorption rate while simultaneously improving absorption performance.

In accordance with an exemplary aspect of the present disclosure, a super absorbent polymer, which is a polyacrylic acid (salt)-based super absorbent polymer, is provided wherein F1 calculated by Equation 1 below is 0.55 to 0.65, and F2 calculated by Equation 2 below is 0.65 to 0.75.

$$F1 = K1 \times [\{(A^{0.1} \times C \times D^{0.5})\}/(B^{0.3})] \quad \text{[Equation 1]}$$

$$F2 = K2 \times [(B^{0.2})/\{(A^{0.1} \times C \times D^{0.5})\}] \quad \text{[Equation 2]}$$

In Equation 1 and Equation 2 above, i) K1 and K2 are respectively correction constants of 0.5 and 0.8, ii) A is centrifuge retention capacity (CRC) measured according to a method of WSP 241.3 of the EDANA method for particles having a particle diameter of 300 μm to 425 μm, and iii) B, C and D are respectively average values of aspect ratio (A/R), convexity, and circularity for particles having a particle diameter of 100 μm to 600 μm.

BRIEF DESCRIPTION OF THE DRAWINGS

Exemplary aspects of the present disclosure can be understood in more detail from the following description taken in conjunction with the accompanying drawings, in which.

DETAILED DESCRIPTION

Figure 1:
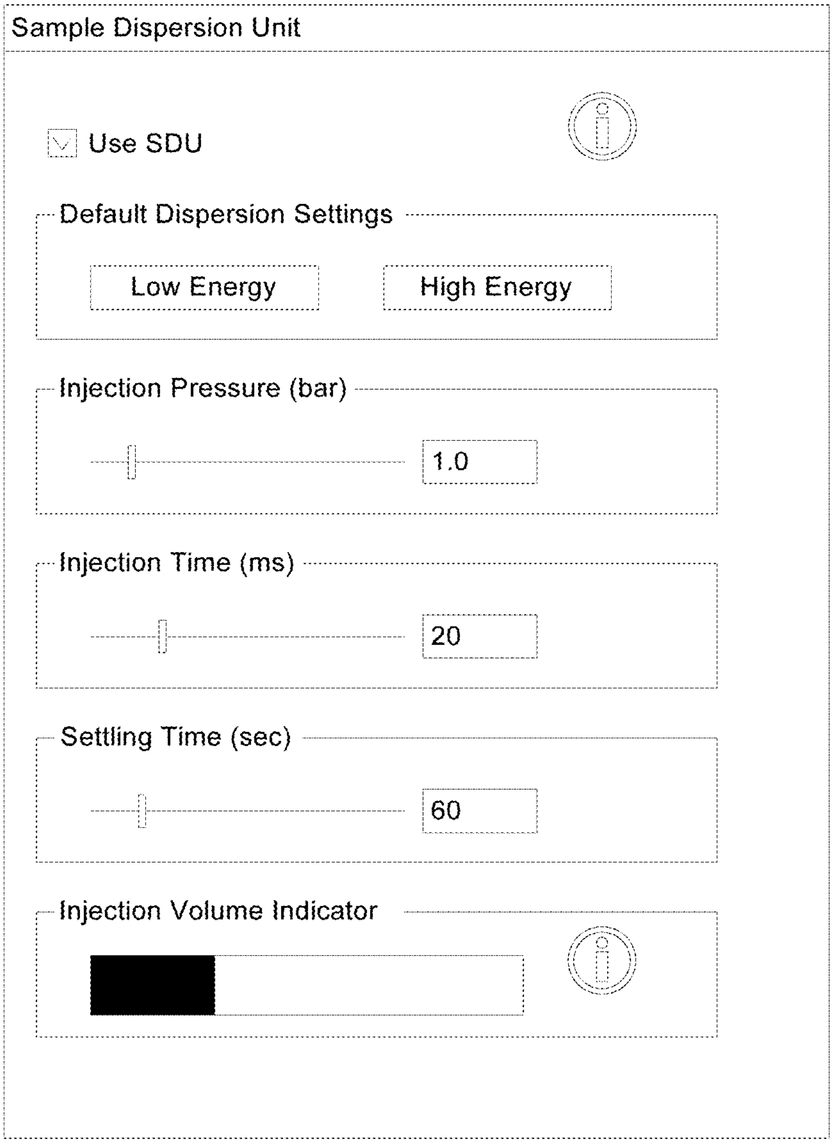
FIG. 1 shows Sample Dispersion Unit setting values in morphologi 4 of Malvern Panalytical Co., Ltd.

Unless otherwise defined herein, all technical and scientific terms are used to describe illustrative aspects only and are not intended to limit the present disclosure. Singular expressions include plural expressions unless the context clearly indicates otherwise. In the present disclosure, it should be understood that the term "include," "comprise," or "have" is intended to specify the presence of stated features, numbers, steps, elements, or combinations thereof, but do not preclude the presence or addition of one or more other features, numbers, steps, elements, or combinations thereof.

The present disclosure may be modified in various ways and may take many forms, and specific aspects are illustrated and described in detail below. It should be understood, however, that it is not intended to limit the present disclosure to the particular forms disclosed, but rather, is intended to cover all modifications, equivalents, and alternatives falling within the spirit and scope of the above ideas and techniques.

The terminology used herein is for reference only to particular implementations, and is not intended to limit the present disclosure. In addition, the singular forms used herein include plural forms, unless the phrases clearly indicate the opposite meaning.

The term “polymer” as used in the present disclosure means that a water-soluble ethylene-based polyunsaturated monomer is in a polymerized state, and may cover any moisture content range or particle diameter range.

In addition, the term “super absorbent polymer” either means, depending on the context, a cross-linked polymer, or a base polymer in the form of powder in which the cross-linked polymer is made of pulverized super absorbent polymer particles, or is used to cover the cross-linked polymer or the base polymer subjected to additional processes, such as drying, pulverization, classification, surface cross-linking, etc., thereby being in a state suitable for commercialization.

In addition, the term “fine powder” means particles having a particle diameter of less than 150 μm among super absorbent polymer particles. The particle diameter of the above-described polymer particles may be measured according to the method of EDANA WSP 220.3 of the European Disposables and Nonwovens Association (EDANA) standards.

In addition, the term “chopping” refers to cutting a hydrogel polymer into small pieces in a millimeter unit to increase drying efficiency, and is used separately from pulverizing the same to a micrometer or normal particle level.

In addition, the term “micronizing, or micronization” refers to pulverizing a hydrogel polymer into pieces having a particle diameter of tens to hundreds of micrometers, and is used separately from “chopping.”

Hereinafter, a super absorbent polymer according to a specific aspect of the present disclosure and a preparation method therefor will be described in more detail.

I. Polyacrylic Acid (Salt)-Based Super Absorbent Polymer

A hydrogel-phase polymer obtained by a polymerization reaction of an acrylic acid-based monomer becomes commercially available as a super absorbent polymer, which is a powder-phase product, by undergoing processes such as drying, grinding, classification, and surface cross-linking. In recent years, attempts have continuously been made to provide a super absorbent polymer exhibiting a further improved absorption rate.

The most general method for increasing the above-described absorption rate may be a method for forming a porous structure inside a super absorbent polymer, thereby widening the surface area of the super absorbent polymer, and in order to widen the surface area of the super absorbent polymer, a method for forming a porous structure inside base polymer powder by including a foaming agent in a monomer composition and performing cross-linking polymerization is generally adopted.

However, a typical method has difficulty in forming a sufficient surface area, and accordingly, there has been a problem in that a body fluid which has not been absorbed during the actual time of urination flows in the inside of a sanitary product or leaks to the outside, thereby causing discomfort to a user.

Accordingly, the present inventors have continued studies for simultaneously improving an absorption rate and absorption performance, and as a result, have found that centrifuge retention capacity (CRC), representing absorption properties of super absorbent polymer particles, and aspect ratio (A/R), convexity, and circularity, which are parameters representing a shape of the super absorbent polymer particles, are closely related to each other.

Specifically, the present inventors have confirmed through experiments that if factor values F1 and F2, which represent the relationship between the centrifuge retention capacity (CRC), the aspect ratio (A/R), the convexity, and the circularity, are adjusted to predetermined values, it is possible to improve an absorption rate while simultaneously improving absorption performance such as centrifuge retention capacity and absorbency under pressure, thereby implementing excellent quality when the corresponding polymer is applied to an actual product, and have completed the present disclosure.

In accordance with an exemplary aspect of the present disclosure, there is provided a super absorbent polymer, which is a polyacrylic acid (salt)-based super absorbent polymer, wherein F1 calculated by Equation 1 below is 0.55 to 0.65, and F2 calculated by Equation 2 below is 0.65 to 0.75.

$$F1 = K1\times[\{(A^{0.1}\times C\times D^{0.5})\}/(B^{0.3})] \quad \text{[Equation 1]}$$

$$F2 = K2\times[(B^{0.2})/\{(A^{0.1}\times C\times D^{0.5})\}] \quad \text{[Equation 2]}$$

In Equation 1 and Equation 2 above, i) K1 and K2 are respectively correction constants of 0.5 and 0.8, ii) A is centrifuge retention capacity (CRC) measured according to a method of WSP 241.3 of the EDANA method for particles having a particle diameter of 300 μm to 425 μm, and iii) B, C and D are respectively average values of aspect ratio (A/R), convexity, and circularity for particles having a particle diameter of 100 μm to 600 μm.

As described above, the present inventors have confirmed that there is a correlation between the absorption properties of a super absorbent polymer and the particle shape thereof, and then have prepared absorbent polymers having various particle shapes to measure values of respective factors related to the shape (aspect ratio, convexity, and circularity) and factors related to the absorption properties (CRC, vortex, and 110 μS/cm 1-minute absorbency), and have confirmed that these values have a specific correlation.

That is, it has been confirmed that the factor value F1 of Equation 1 above is proportional to vortex time, and the factor value F2 of Equation 2 above is proportional to 1-minute absorbency in water having an electrical conductivity value of 110 μS/cm.

Therefore, if the factor values F1 and F2 of Equations 1 and 2 above are adjusted to a specific range, it is possible to implement a super absorbent polymer having an excellent physical property balance by improving an absorption rate while simultaneously improving performance.

Specifically, the super absorbent polymer of the present disclosure may have a factor value F1 of Equation 1 above of 0.55 or greater, 0.56 or greater, 0.57 or greater, or 0.58 or greater, and 0.65 or less, 0.64 or less, 0.63 or less, 0.62 or less, or 0.61 or less.

If the F1 value satisfies the above-described numerical range, the pore structure in particles of the super absorbent polymer may be developed or the specific surface area of the particles may be increased, so that the super absorbent polymer may have an excellent absorption rate, but if the above-described numerical range is not satisfied, the surface of a diaper which is a final product, may become damp or leaky.

In addition, the super absorbent polymer of the present disclosure may have a factor value F2 of Equation 2 above of 0.65 or greater, 0.66 or greater, 0.67 or greater, or 0.68 or greater, and 0.75 or less, 0.74 or less, 0.73 or less, 0.72 or less, or 0.71 or less.

If the F2 value satisfies the above-described numerical range, initial absorption properties are excellent and the surface of a diaper may feel soft, smooth, and dry, but if the above-described numerical range is not satisfied, there may be a problem of cost increase due to an increase in the amount of a super absorbent polymer used in the core of absorption of the diaper.

In Equation 1 and Equation 2 above, the centrifuge retention capacity (CRC) refers to an absorption magnification under no load of a super absorbent polymer, and the larger the value thereof, the better the absorption performance of the super absorbent polymer.

Specifically, the super absorbent polymer of the present disclosure may have a centrifuge retention capacity (CRC) in the range of 30 g/g or greater, 31 g/g or greater, or 32 g/g or greater, and 50 g/g or less, 45 g/g or less, or 40 g/g or less, as measured for a particle having a particle diameter of 300 μm to 425 μm according to the method of EDANA WSP 241.3.

The centrifuge retention capacity (CRC) may be measured according to the method of EDANA WSP 241.3 of the European Disposables and Nonwovens Association (EDANA) standards, and a specific measurement method will be described in more detail in the following experimental examples.

Meanwhile, the aspect ratio (A/R) is a parameter that can determine the symmetry of particles, and refers to a ratio of the shortest diameter of particles to the longest diameter of the particles.

A value of the aspect ratio value has a value of 0 to 1, wherein if all axes are symmetrical to each other as in a complete sphere or square, the value of the aspect ratio value is 1, and the closer the aspect ratio is to 1, the closer the shape of particles is to symmetry, and the closer the aspect ratio is to 0, the closer the shape of particles to asymmetry.

Specifically, the super absorbent polymer of the present disclosure may have an average value of aspect ratio (A/R) of 0.65 or greater, 0.67 or greater, 0.69 or greater, 0.70 or greater, 0.71 or greater, or 0.72 or greater, and 0.85 or less, 0.84 or less, 0.83 or less, 0.82 or less, 0.81 or less, or 0.80 or less for particles having a particle diameter of 100 μm to 600 μm.

It can be seen that the smaller the average value of aspect ratio, the greater the specific surface area due to an increase in the asymmetry of particles, but when only the specific surface area is increased, there may be a problem in that absorption performance such as centrifuge retention capacity and absorbency under pressure are deteriorated.

Therefore, in order to simultaneously improve an absorption rate and absorption performance to achieve an excellent property balance, the average value of aspect ratio may be, for example, 0.65 to 0.85 for particles having a particle diameter of 100 μm to 600 μm.

Meanwhile, the convexity is a parameter for measuring the particle outline and the surface roughness of a particle, and is calculated by Equation 3 below.

$$\text{Convexity} = \text{convex hull perimeter}/\text{actual particle perimeter} \quad \text{[Equation 3]}$$

In Equation 3 above, the convex hull perimeter refers to the length of an elastic band when it is assumed that an image captured as a 2D image of a 3-dimensional particle to be measured is surrounded by the imaginary elastic band which stretches around the outline of the image, and the actual particle perimeter refers to an actual perimeter of the image captured as a 2D image of a 3-dimensional particle to be measured.

A value of the convexity has a value of 0 to 1, and it can be seen that the closer the convexity is to 1, the smoother the outline of particles, and it can be seen that the closer the convexity is to 0, the rougher or more uneven the outline of particles.

Specifically, the super absorbent polymer of the present disclosure may have an average value of convexity of 0.80 or greater, 0.82 or greater, 0.84 or greater, or 0.86 or greater, and 0.94 or less, 0.92 or less, or 0.90 or less for particles having a particle diameter of 100 μm to 600 μm.

It can be seen that the smaller the average value of convexity, the larger the specific surface area, but when only the specific surface area is increased, in the mixing of particles of a super absorbent polymer and a surface cross-linker, there may be a problem in that absorbency under pressure is degraded due to non-uniform coating, or absorption performance such as centrifuge retention capacity and absorbency under pressure are deteriorated due to an increase in the input amount of the surface cross-linker in order to increase coating efficiency.

Therefore, in order to simultaneously improve an absorption rate and absorption performance to achieve an excellent property balance, the average value of convexity may be, for example, 0.80 to 0.94 for particles having a particle diameter of 100 μm to 600 μm.

Meanwhile, the circularity is a parameter that can determine how close super absorbent polymer particles are to a perfect sphere, and is calculated by Equation 4 below.

$$\text{Circularity} = CE \text{ particle perimeter}/\text{actual particle perimeter} \quad \text{[Equation 4]}$$

In Equation 4 above, the CE particle perimeter refers to a CE perimeter of a circle equivalent having the same area as the image captured as a 2D image of a 3D particle to be measured, and the actual particle perimeter refers to an actual perimeter of the image captured as a 2D image of a 3-dimensional particle to be measured.

A value of the circularity has a value of 0 to 1, wherein a perfect sphere has circularity is 1, and it can be seen that the closer the circularity is to 1, the closer the particle is to a perfect sphere, and the closer the circularity is to 0, the more the particle has a very pointed shape, for example, a very narrow rod-like shape.

Specifically, the super absorbent polymer of the present disclosure may have an average value of circularity of 0.70 or greater, 0.71 or greater, 0.72 or greater, 0.73 or greater, or 0.74 or greater, and 0.90 or less, 0.88 or less, 0.86 or less, 0.84 or less, or 0.82 or less for particles having a particle diameter of 100 μm to 600 μm.

It can be seen that the smaller the average value of circularity, that is, the more the particle deviates from a perfect sphere and has a very pointed shape, the larger the specific surface area, but when only the specific surface area is increased, there may be a problem in that absorption performance such as centrifuge retention capacity and absorbency under pressure are deteriorated.

Therefore, in order to simultaneously improve an absorption rate and absorption performance to achieve an excellent property balance, the average value of circularity may be, for example, 0.70 to 0.90 for particles having a particle diameter of 100 μm to 600 μm.

The average values of the aspect ratio, the convexity, and the circularity are respectively derived from statistical results obtained by randomly scattering particles on a stage by vacuum in a measuring apparatus, and then securing 200 or more of n numbers to average the numbers.

In addition, the aspect ratio, the convexity, and the circularity are similar in that the shape of super absorbent polymer particles are quantified thereby, but each have different meanings.

That is, if the shape of particles changes, the aspect ratio, the convexity, and the circularity values may all change or only some thereof may change.

The aspect ratio, the convexity, and the circularity described above may be measured using various commercial apparatuses for quantifying and analyzing the morphology of particles based on image analysis of the particles. For example, the parameters may be measured by morphologi 4 of Malvern Panalytical Co., Ltd., and specifically, may be measured by the following four steps, which will be described in more detail in the following experimental examples.

1) Preparation of sample: Particles of a super absorbent polymer to be measured are prepared. At this time, if measuring the aspect ratio, convexity, and circularity for particles having a specific range of particle diameter, the particles having a specific particle diameter are classified at 1.0 amplitude for 10 minutes by using a classifier of Retsch Company to prepare a sample.

At this time, the particle diameter of the particles of the super absorbent polymer may be measured according to the method of EDANA WSP 220.3 of the European Disposables and Nonwovens Association (EDANA) standards.

2) Image acquisition: The prepared sample is set on a stage in an instrument, and then scanned at a magnification of 2.5 to obtain images of individual particles.

3) Image processing: For the acquired images, parameter values for each particle, such as an image obtained by capturing a 2D image of a 3-dimensional particle, a circle equivalent (CE) diameter, the shortest diameter, the longest diameter, and the perimeter of an actual particle, are measured.

4) Based on the data analyzed for each particle, a distribution diagram is derived for the parameters for all particles included in the sample.

Meanwhile, the super absorbent polymer may have an average value of circle equivalent (CE) diameters of 350 μm to 490 μm.

The CE diameter may refer to a diameter of a circle having the same area as the image obtained by capturing a 3D image of a particle as a 2D image, and the size of the particle may be represented by means of the CE diameter.

However, since particles having different shapes may have the same CE diameter value, the shape of particles may be represented through the circularity and the aspect ratio of the particles together with the CE diameter.

The average value of CE diameters of the super absorbent polymer may be 350 μm or greater, 370 μm or greater, or 390 μm or greater, and 490 μm or less, 480 μm or less, or 470 μm or less.

Super absorbent polymers may have different tendencies in absorption properties, absorption rate, and the like depending on the particle size thereof, and the larger the particle size, the larger the capacity of accommodating water, but the longer it takes to absorb water, and the smaller the particle size, the faster it takes to absorb water, but the smaller the capacity of accommodating water. Therefore, it is necessary to have a suitable particle size distribution, and when a super absorbent polymer has the particle size of the super absorbent polymer according to the present disclosure, the super absorbent polymer may have an excellent physical property balance in both absorption capacity and absorption rate.

In addition, the super absorbent polymer prepared according to an aspect of the present disclosure may have a uniform particle diameter distribution, and accordingly, it is possible to provide a super absorbent polymer excellent in overall absorption properties such as centrifuge retention capacity and absorbency under pressure, and rewet properties, and in particular, excellent in physical properties of initial absorption magnification.

The super absorbent polymer according to an aspect of the present disclosure may have a high absorption rate and a low fine powder content, and may have centrifuge retention (CRC) and absorbency under pressure (AUP), which are overall absorption properties, equal to or higher than those of a super absorbent polymer prepared by a typical method.

In addition, it is possible to provide a super absorbent polymer excellent in permeability and rewet properties due to a lower content of extractable contents (EC).

The super absorbent polymer of the present disclosure may have vortex time of 40 seconds or less as measured according to a vortex measurement method at 24.0° C. for particles having a particle diameter of 300 μm to 425 μm.

More specifically, the vortex time may be 40 seconds or less, 35 seconds or less, 33 seconds or less, or 30 seconds or less. In addition, the smaller the value, the better the vortex time, and although the lower limit of the vortex time is theoretically 0 second, it may be, for example, 10 seconds or more, 15 seconds or more, or 20 seconds or more.

In this case, a method for measuring the vortex time of the super absorbent polymer will be described in more detail in the experimental examples to be described later.

In addition, in the super absorbent polymer of the present disclosure, when 1 g of particles having a particle diameter of 300 μm to 425 μm are swollen for 1 minute with water having an electrical conductivity value of 110 μS/cm, the free swell capacity of water containable by the super absorbent polymer may be 120 g or more, 125 g or more, 130 g or more, or 135 g or more, and 230 g or less, 225 g or less, 220 g or less, or 215 g or less.

A method for measuring absorbency in the water having an electrical conductivity value of 110 μS/cm will be described in more detail in the section of experimental examples to be described later.

Meanwhile, factor values F1 and F2 representing the relationship between the centrifuge retention capacity (CRC), the aspect ratio (A/R), the convexity, and the circularity according to the present disclosure may be implemented by controlling components/contents of a super absorbent polymer, preparation process conditions of the super absorbent polymer, and the like.

For example, the factor values F1 and F2 representing the relationship between the centrifuge retention capacity (CRC), the aspect ratio (A/R), the convexity, and the circularity may be controlled to have specific ranges by the control of the type and content of a monomer composition in a polymerization process, the type and timing of introduction of a surfactant in a micronization step, the type, rotation speed, hole size, number of micronization, and the like of a micronization device.

This will be described in more detail in Item II of the method for preparing a super absorbent polymer.

Hereinafter, each component constituting the super absorbent polymer will be described in more detail.

A polyacrylic acid (salt)-based super absorbent polymer of an aspect of the disclosure includes a base polymer including a water-soluble ethylene-based unsaturated monomer having an acid group and a cross-linked polymer of an internal cross-linking agent. The cross-linked polymer may be formed by polymerizing a monomer composition which includes components such as a monomer, an internal cross-linking agent, a polymerization initiator, and the like.

Here, the water-soluble ethylene-based unsaturated monomer may be any monomer commonly used in the preparation of a super absorbent polymer. As a non-limiting example, the water-soluble ethylene-based unsaturated monomer may be a compound represented by Formula 1 below.

R—COOM' [Formula 1]

In Formula 1 above, R is an alkyl group having 2 to 5 carbon atoms including an unsaturated bond, and M' is a hydrogen atom, a monovalent or divalent metal, an ammonium group, or an organic amine salt.

For example, the monomer may be a (meth)acrylic acid, and one or more selected from the group consisting of a monovalent (alkali) metal salt, a divalent metal salt, an ammonium salt, and organic amine salt of these acids.

If the (meth)acrylic acid and/or a salt thereof is used as the water-soluble ethylene-based unsaturated monomer as described above, it is advantageous in terms of obtaining a super absorbent polymer with improved absorbency. In addition, as the monomer, maleic anhydride, fumaric acid, crotonic acid, itaconic acid, 2-acryloylethane sulfonic acid, 2-methacryloylethanesulfonic acid, 2-(meth)acryloylpropanesulfonic acid or 2-(meth)acrylamide-2-methyl propane sulfonic acid, (meth)acrylamide, N-substituted (meth)acrylate, 2-hydroxyethyl (meth)acrylate, 2-hydroxypropyl (meth)acrylate, methoxypolyethylene glycol (meth)acrylate, polyethylene glycol (meth)acrylate, (N,N)-dimethylaminoethyl (meth)acrylate, (N,N)-dimethylaminopropyl (meth) acrylamide, or the like may be used.

The water-soluble ethylene-based unsaturated monomer has an acid group. Meanwhile, in the preparation of the super absorbent polymer, at least a portion of the acid group forms a polymer by cross-linking a monomer neutralized by a neutralizing agent, but in the present disclosure, the acid group may be neutralized not during polymerization, but after the formation of a polymer. More specific details on this will be provided in the section on a method for preparing a super absorbent polymer.

The concentration of the water-soluble ethylene-based unsaturated monomer in the monomer composition may be appropriately adjusted in consideration of polymerization time, reaction conditions, etc., and may be about 20 wt % to about 60 wt %, or about 20 wt % to about 40 wt %.

As used herein, the term "internal cross-linking agent" is a term used to distinguish the same from a surface cross-linking agent for performing cross-linking on the surface of super absorbent polymer particles to be described later, and an internal cross-linking agent serves to form a polymer including a cross-linking structure by introducing a cross-linking bond between unsaturated bonds of the above-described water-soluble ethylene-based unsaturated monomers.

The cross-linking in the above step is performed without distinction between the surface and the inside, but if a surface cross-linking process of the super absorbent polymer particles to be described later is performed, the surfaces of finally prepared super absorbent polymer particles may include a structure newly cross-linked by the surface cross-linking agent, and the inside of the super absorbent polymer particles may maintain a structure cross-linked by the internal cross-linking agent.

According to an aspect of the present disclosure, the internal cross-linking agent may include one or more of a polyfunctional acrylate-based compound, a polyfunctional allyl-based compound, or a polyfunctional vinyl-based compound.

Non-limiting examples of the polyfunctional acrylate-based compound may include ethylene glycol di(meth) acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, tripropylene glycol di(meth)acrylate, polypropylene glycol di(meth)acrylate, butanediol di(meth) acrylate, butylene glycol di(meth)acrylate, hexanediol di(meth)acrylate, pentaerythritol di(meth)acrylate, pentaerythritol tri(meth)acrylate, pentaerythritol tetra(meth) acrylate, dipentaerythritol di(meth)acrylate, dipentaerythritol tri(meth)acrylate, dipentaerythritol tetra(meth)acrylate, dipentaerythritol penta(meth)acrylate, trimethylolpropane di(meth)acrylate, trimethylolpropane tri(meth)acrylate, glycerin di(meth)acrylate, glycerin tri(meth)acrylate, or the like, and any one thereof may be used alone, or two or more thereof may be mixed and used.

Non-limiting examples of the polyfunctional allyl-based compound may include ethylene glycol diallyl ether, diethylene glycol diallyl ether, triethylene glycol diallyl ether, tetraethylene glycol diallyl ether, polyethylene glycol diallyl ether, propylene glycol diallyl ether, tripropyleneglycol diallyl ether, polypropylene glycol diallyl ether, butanediol diallyl ether, butylene glycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, glycerin triallyl ether, or the like, and any one thereof may be used alone, or two or more thereof may be mixed and used.

Non-limiting examples of the polyfunctional vinyl-based compound may include ethylene glycol divinyl ether, diethylene glycol divinyl ether, triethylene glycol divinyl ether, tetraethylene glycol divinyl ether, polyethylene glycol divinyl ether, propylene glycol divinyl ether, tripropylene glycol divinyl ether, polypropylene glycol divinyl ether, butanediol divinyl ether, butylene glycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentavinyl ether, trimethylolpropane divinyl ether, trimethylolpropane trivinyl ether, glycerin divinyl ether, glycerin trivinyl ether, or the like, and any one thereof may be used alone or two or more thereof may be mixed and used. For example, pentaerythritol triallyl ether may be used.

In the above-described polyfunctional allyl-based compound, or the polyfunctional vinyl-based compound, two or more unsaturated groups included in a molecule may be respectively bonded to unsaturated bonds of the water-soluble ethylene-based unsaturated monomers or unsaturated bonds of another internal cross-linking agent, thereby forming a cross-linking structure during a polymerization process, and unlike an acrylate-based compound including an ester bond (—(C═O)O—) in a molecule, may maintain cross-linking bonds more stably even during a neutralization process to be described later after the polymerization reaction.

Accordingly, the gel strength of a prepared super absorbent polymer may increase, the process stability may increase during a discharge process after polymerization, and the amount of extractable contents may be reduced to a minimum.

Cross-linking polymerization of the water-soluble ethylene-based unsaturated monomer in the presence of the above-described internal cross-linking agent may be performed in the presence of a polymerization initiator, and if necessary, a thickener, a plasticizer, a preservation stabilizer, an antioxidant, or the like.

In the monomer composition, the above-described internal cross-linking agent may be used in an amount of 0.01 parts by weight to 5 parts by weight based on 100 parts by weight of the water-soluble ethylene-based unsaturated monomer. For example, the internal cross-linking agent may be used in an amount of 0.01 parts by weight or greater, 0.05 parts by weight or greater, or 0.1 parts by weight or greater, and 5 parts by weight or less, 3 parts by weight or less, 2 parts by weight or less, 1 part by weight or less, or 0.7 parts by weight or less. If the content of the internal cross-linking agent is too low, cross-linking is not sufficiently achieved, so that it may be difficult to implement strength of an appropriate level or above, and if the content of the internal cross-linking agent is too high, the internal cross-linking density increases, so that it may be difficult to implement a desired centrifuge retention capacity. In particular, in the above-described range, it is suitable to implement the factor values F1 and F2 representing the relationship between the centrifuge retention capacity (CRC), the aspect ratio (A/R), the convexity, and the circularity of the present disclosure to be within desired ranges.

A polymer formed using such an internal cross-linking agent has a three-dimensional network structure in the form in which main chains formed by the polymerization of the water-soluble ethylene-based unsaturated monomers are cross-linked by the internal cross-linking agent. As described above, if a polymer has a three-dimensional network structure, the centrifuge retention capacity and the absorbency under pressure, which are overall physical properties of a super absorbent polymer, may be significantly improved compared to having a two-dimensional linear structure in which additional cross-linking is not performed by an internal cross-linking agent.

The polymer is prepared by polymerizing a monomer and an internal cross-linking agent in the presence of a polymerization initiator, and the type of the polymerization initiator is not particularly limited, but for example, the polymerization may be performed using a thermal polymerization method in a batch reactor, and accordingly, a thermal polymerization initiator may be used as the polymerization initiator.

As the thermal polymerization initiator, one or more selected from the group consisting of a persulfate-based initiator, an azo-based initiator, and an initiator composed of hydrogen peroxide and ascorbic acid may be used. Specifically, examples of the persulfate-based initiator include sodium persulfate ($Na_2S_2O_8$), potassium persulfate ($K_2S_2O_8$), ammonium persulfate ($(NH_4)_2S_2O_8$), or the like, and examples of the azo-based initiator include 2,2-azobis (2-amidinopropane) dihydrochloride, 2,2-azobis-(N,N-dimethylene)isobutyramidine dihydrochloride, 2-(carbamoylazo)isobutylonitril, 2,2-azobis [2-(2-imidazolin-2-yl) propane] dihydrochloride, 4,4-azobis-(4-cyanovaleric acid), or the like. More various thermal polymerization initiators are well specified on p203 of 'Principle of Polymerization (Wiley, 1981)' written by Odian, and are not limited to the above-described examples.

The above-described polymerization initiator may be used in an amount of 2 parts by weight or less based on 100 parts by weight of the water-soluble ethylene-based unsaturated monomer. That is, if the concentration of the polymerization initiator is too low, the polymerization rate may decrease, and remaining monomers may be extracted in a large amount in a final product. On the contrary, if the concentration of the polymerization initiator is higher than the above-described range, polymer chains forming a network may be shortened, thereby degrading the physical properties of a polymer, such as increasing the content of extractable contents and lowering the absorbency under pressure.

Meanwhile, in an aspect of the present disclosure, the above-described polymerization initiator and a reducing agent forming a redox couple may be introduced together to the monomer composition to initiate polymerization.

Specifically, the initiator and the reducing agent react with each other when introduced to a polymer solution and form radicals.

The formed radicals react with the monomer, and since an oxidation-reduction reaction between the initiator and the reducing agent is highly reactive, polymerization is initiated even when only a trace amount of the initiator and the reducing agent are introduced, so that it is not necessary to increase the process temperature, thereby allowing low-temperature polymerization, and it is possible to minimize changes in physical properties of the polymer solution.

The polymerization reaction using the oxidation-reduction reaction may smoothly occur even at a temperature near or below room temperature (25° C.). For example, the polymerization reaction may be performed at a temperature of 5° C. to 25° C. or 5° C. to 20° C.

In an aspect of the present disclosure, if a persulfate-based initiator is used as the initiator, the reducing agent may be one or more selected from the group consisting of sodium metabisulfite ($Na_2S_2O_5$), tetramethyl ethylenediamine (TMEDA), a mixture of iron (II) sulfate and EDTA ($FeSO_4$/EDTA), sodium formaldehyde sulfoxylate, and disodium 2-hydroxy-2-sulfinoacteate.

As an example, potassium persulfate may be used as the initiator, and disodium 2-hydroxy-2-sulfinoacteate may be used as the reducing agent, ammonium persulfate may be used as the initiator, and tetramethylammoniumdiamine may be used as the reducing agent, sodium persulfate may be used as the initiator, and sodium formaldehyde sulfoxylate may be used as the reducing agent.

In another aspect of the present disclosure, when a hydrogen peroxide-based initiator is used as the initiator, the reducing agent may be one or more selected from the group consisting of ascorbic acid, sucrose, sodium sulfite ($Na_2SO_3$), sodium metabisulfite ($Na_2S_2O_5$), tetramethyl ethylenediamine (TMEDA), a mixture of iron (II) sulfate and EDTA ($FeSO_4$/EDTA), sodium formaldehyde sulfoxylate, disodium 2-hydroxy-2-sulfinoacteate, and disodium 2-hydroxy-2-sulfoacteate.

The above-described monomer composition may further include an additive such as a thickener, a plasticizer, a preservation stabilizer, an antioxidant, or the like, if necessary.

In addition, the monomer composition including monomers may be, for example, in the state of a solution dissolved in a solvent such as water, and the content of solids in the monomer composition of the above-described solution state, i.e., the concentration of the monomers, the internal cross-linking agent, and the polymerization initiator, may be adjusted appropriately in consideration of the polymerization time, reaction conditions, etc. For example, the content of solids in the monomer composition may be 10 wt % to 80 wt %, 15 wt % to 60 wt %, or 30 wt % to 50 wt %.

A solvents that may be used at this time may be used without limitation in composition as long as the solvent can dissolve the above-mentioned components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butylolactone, carbitol, methyl cellosolve acetate, N,N-dimethylacetamide, or the like may be used in combination.

The polymer obtained by the above-described method may form a polymer having a high molecular weight and a uniform molecular weight distribution due to polymerization using an ethylene-based unsaturated monomer in an unneutralized state, and is suitable to implement the factor values F1 and F2 representing the relationship between the centrifuge retention capacity (CRC), the aspect ratio (A/R), the convexity, and the circularity of the present disclosure, which are target values, to be within desired ranges due to a reduced content of the extractable contents.

In addition, the polymer may have a moisture content of 30 wt % to 80 wt %. For example, the moisture content of the polymer may be 30 wt % or greater, 45 wt % or greater, or 50 wt % or greater, and 80 wt % or less, 70 wt % or less, or 60 wt % or less.

If the moisture content of the polymer is too low, it is difficult to obtain an appropriate surface area in a pulverization step, so that effective pulverization may not be achieved, and if the moisture content of the polymer is too high, a pressure applied in the pulverization step may increase, so that it may be difficult to perform pulverization to a desired particle size.

Meanwhile, throughout the present specification, the term "moisture content" refers to a value obtained by subtracting the weight of a polymer in a dry state from the weight of the polymer by the content of moisture occupying with respect to the total weight of the polymer. Specifically, the moisture content is defined as a value calculated by measuring the weight loss due to moisture evaporation from a polymer during a drying process performed by raising the temperature of the polymer in a crumb state through infrared heating. At this time, conditions of the drying are to increase the temperature from room temperature to about 180° C. and then maintain the temperature at 180° C., and the total drying time is set to 40 minutes, including 5 minutes for raising the temperature, and then the moisture content is measured.

The super absorbent polymer according to an aspect of the present disclosure includes the above-described base polymer powder containing the water-soluble ethylene-based unsaturated monomer having an acid group and the cross-linked polymer of an internal cross-linking agent, and a surface cross-linked layer formed on the base polymer powder by further cross-linking the cross-linked polymer by means of a surface cross-linking agent.

The surface cross-linked layer is formed on at least a portion of the surface of the base polymer powder, and may be formed by further cross-linking the cross-linked polymer included in the base polymer powder by means of the surface cross-linking agent.

As the surface cross-linking agent, any surface cross-linking agent used in the preparation of a super absorbent polymer may be used without particular limitation. For example, the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1, 3-propanediol, 2,5-hexanediol, 2-methyl-1,3-pentanediol, 2-methyl-2,4-pentanediol, tripropylene glycol, and glycerol, at least one carbonate-based compound selected from the group consisting of ethylene carbonate, propylene carbonate, and glycerol carbonate, an epoxy compound such as ethylene glycol diglycidyl ether, an oxazoline compound such as oxazolidinone, a polyamine compound, a mono-, di- or polyoxazolidinone compound, a cyclic urea compound, or the like.

Specifically, one or more, two or more, or three or more of the above-described surface cross-linking agents may be used as the surface cross-linking agent, and for example, ethylene carbonate-propylene carbonate (ECPC), propylene glycol, and/or glycerol carbonate may be used.

The above-described surface cross-linking agent may be used in an amount of about 0.001 parts by weight to about 5 parts by weight based on 100 parts by weight of the super absorbent polymer particles. For example, the surface cross-linking agent may be used in an amount of 0.005 parts by weight or greater, 0.01 parts by weight or greater, or 0.05 parts by weight or greater, and 5 parts by weight or less, 4 parts by weight or less, or 3 parts by weight or less based on 100 parts by weight of the super absorbent polymer particles. The content range of the surface cross-linking agent may be adjusted to be within the above-described range to prepare a super absorbent polymer exhibiting excellent overall absorption physical properties. In particular, in the above-described range, it is suitable to implement the factor values F1 and F2 representing the relationship between the centrifuge retention capacity (CRC), the aspect ratio (A/R), the convexity, and the circularity of the present disclosure to be within desired ranges.

In addition, the surface cross-linked layer may be formed by adding an inorganic material to the surface cross-linking agent. That is, in the presence of the surface cross-linking agent and the inorganic material, the surface cross-linked layer may be formed by further cross-linking the surface of the base polymer powder.

As the above-described inorganic material, one or more inorganic materials selected from the group consisting of silica, clay, alumina, a silica-alumina composite, titania, a zinc oxide, and an aluminum sulfate may be used. The above-described inorganic material may be used in a powder form or a liquid form, and particularly, may be used as alumina powder, silica-alumina powder, titania powder, or a nano-silica solution. In addition, the inorganic material may be used in an amount of about 0.001 parts by weight to about 1 part by weight based on 100 parts by weight of super absorbent polymer particles.

As described above, by controlling the factor values F1 and F2 representing the relationship between the centrifuge retention capacity (CRC), the aspect ratio (A/R), the convexity, and the circularity, which are the parameters of the present disclosure described above, to be within desired ranges, the super absorbent polymer including the base polymer powder and the surface cross-linked layer formed on the base polymer powder may absorb discharged body fluids at a high speed when applied to a hygiene product such as a diaper, and may also absorb a relatively large amount thereof in the beginning, and thus, may prevent a problem such as accumulation of body fluids inside the hygiene product or leakage thereof to the outside.

II. Method for Preparing Super Absorbent Polymer

Meanwhile, a typical super absorbent polymer is prepared in the presence of an internal cross-linking agent and a polymerization initiator by cross-linking polymerizing a water-soluble ethylene-based unsaturated monomer to form a hydroxyl gel polymer, drying the hydroxyl gel polymer thus formed, and then pulverizing the same to a desired particle size, and typically, at this time, in order to facilitate the drying of the hydroxyl gel polymer, and to increase the efficiency of the pulverization process, a chopping process is performed in which the hydroxyl gel polymer is cut into particles having a size of several millimeters prior to the drying process. However, in the above-described chopping process, due to the adhesiveness of the hydrogel polymer, the hydrogel polymer is not pulverized to a micro-size particle level and becomes an aggregated gel form. When the hydrogel polymer in the form of the aggregated gel is dried, a plate-shaped dried body is formed, and in order to pulverize the same to a micro-size particle level, a pulverization process may be performed to reduce the adhesiveness of the multi-stage polymer, wherein there has been a problem in which a large amount of fine powder is generated in the process.

Specifically, a typical super absorbent polymer has been prepared by the following steps.

(Neutralization) Neutralizing at least a portion of an acid group of a water-soluble ethylene-based unsaturated monomer, (Polymerization) cross-linking polymerizing, in the presence of an internal cross-linking agent and a polymerization initiator, the water-soluble ethylene-based unsaturated monomer having the acid group at least partially neutralized to form a hydrogel polymer, (Chopping) chopping the hydrogel polymer, (Drying) drying the chopped hydrogel polymer, and (Pulverization/Classification) pulverizing the dried polymer and classifying the same into normal particles and fine powder.

As described above, the chopped hydrogel polymer has the form of aggregated gel of about 1 cm to about 10 cm in size, and the chopped hydrogel polymer is stacked on a belt formed of a perforated plate, and then dried by hot air supplied from the top or the bottom. Since the polymer dried by the above-described drying method exhibits a plate shape rather than a particle shape, the pulverization followed by the classification has been performed in steps of performing coarse pulverization and then classification such that prepared particles become normal particles, that is, particles having a particle diameter of 150 μm to 850 μm, and then performing find pulverization and then classification thereon. Since the amount of fine powder separated in a final classification step by the above-described preparation method is as large as about 20 wt % to about 30 wt % based on the total weight of a finally prepared super absorbent polymer, the separated fine powder has been reused by being mixed with an appropriate amount of water to be re-assembled, and then being introduced in a step before the chopping step or the drying step.

However, when the fine powder re-assembled body mixed with water for reuse of the fine powder is re-introduced in the pulverization or drying process, there has been a problem of causing an increase in equipment load and/or energy usage, and degradation in the physical properties of a super absorbent polymer has been caused due to remaining fine powder that has not been classified.

As a result of repeated research for solving the above-described problem, it has been confirmed that, instead of performing polymerization in a state in which an acid group of a water-soluble ethylene-based unsaturated monomer is neutralized as in a typical method for preparing a super absorbent polymer, if polymerization is first performed to form a polymer in a state in which an acid group is not neutralized, and the hydrogel polymer is micronized in the presence of a surfactant, followed by neutralizing an acid group of the polymer, the acid group of the polymer is neutralized to form a hydrogel polymer, and then the hydrogel polymer is micronized in the presence of a surfactant, or the acid group present in the polymer is neutralized at the same time as micronization, the surfactant is present in a large amount on the surface of the polymer, and is allowed to sufficiently serve to lower high adhesiveness of the polymer, thereby preventing the polymer from being excessively aggregated, and to control the aggregation status to a desired level.

At this time, if ultra-fine pulverization is performed by applying high-intensity mechanical shearing force in the micronization step, it is possible to form aggregated hydrogel particles having finer micropores.

The hydrogel polymer prepared by the ultra-fine pulverization performed by applying the high-intensity mechanical shearing force is prepared in the form of particles having stable micropores of 100 μm or less, and then subjected to pulverization and drying processes later under milder conditions, so that it is possible to further reduce the amount of fine powder generated during the processes.

In addition, through the ultra-fine pulverization process using the high-intensity mechanical shearing force, it is possible to form micropores in the hydrogel polymer without using a separate foaming agent in the polymerization step, so that the vortex time is also improved, and accordingly, it is easy to control the factor values F1 and F2 representing the relationship between the centrifuge retention capacity (CRC), the aspect ratio (A/R), the convexity, and the circularity of the present disclosure described above to be within desired ranges.

Meanwhile, the hydrogel micronization process may be performed in the presence of a surfactant. By using a surfactant in the micronization step, the aggregation of particles may be effectively controlled, and accordingly, the productivity may be further improved by lowering the load of a device.

In addition, when a polymer is formed by performing polymerization first in an unneutralized state, and then an acid group present in the polymer is neutralized, it is possible to form a polymer having a longer chain, so that an effect of reducing the content of extractable contents present in a uncross-linked state due to incomplete cross-linking may be achieved.

Since the extractable contents are easily eluted when the super absorbent polymer comes in contact with a liquid, if the content of the extractable contents is high, most of eluted extractable contents remain on the surface of the super absorbent polymer and make the super absorbent polymer sticky, thereby causing the decrease in permeability. Therefore, in terms of permeability, it is important to keep the content of extractable contents low.

According to an aspect of the present disclosure, since the polymerization is performed in the unneutralized state, the content of extractable contents is lowered, so that the permeability of the super absorbent polymer may be improved, and accordingly, it has been confirmed that it is easy to control the circularity and the aspect ratio to be within desired ranges.

Hereinafter, a method for preparing a super absorbent polymer according to one aspect will be described in more detail for each step.

Step 1: Polymerization Step

First, polymerization is performed on a monomer composition including a water-soluble ethylene-based unsaturated monomer having an acid group and an internal cross-linking agent to prepare base polymer powder in which the water-soluble ethylene-based unsaturated monomer having an acid group and the internal cross-linking agent are cross-linking polymerized.

The above-described step may include mixing the water-soluble ethylene-based unsaturated monomer having and acid group, the internal cross-linking agent, and a polymerization initiator to prepare a monomer composition and polymerizing the monomer composition to form a polymer.

Here, the same contents described with reference to the super absorbent polymer of Item I above may be equally applied to each component.

Meanwhile, the water-soluble ethylene-based unsaturated monomer has an acid group. As described above, in the preparation of a typical super absorbent polymer, the monomer in which at least a portion of an acid group has been neutralized by a neutralizing agent is cross-linked to form a polymer. Specifically, in the step of mixing the water-soluble ethylene-based unsaturated monomer having an acid group, the internal cross-linking agent, the polymerization initiator, and the neutralizing agent, at least a portion of the acid group of the water-soluble ethylene-based unsaturated monomer has been neutralized.

However, according to an aspect of the present disclosure, a polymer is formed by performing polymerization first in a state in which the acid group of the water-soluble ethylene-based unsaturated monomer is not neutralized.

The water-soluble ethylene-based unsaturated monomer (e.g., acrylic acid) in a state in which the acid group is not neutralized is in a liquid state at room temperature and has high miscibility with a solvent (water), thereby being present in a mixed solution state in a monomer composition. However, the water-soluble ethylene-based unsaturated monomer in which the acid group is neutralized is in a solid state at room temperature, has different solubility depending on the temperature of a solvent (water), and has lower solubility as a lower temperature.

The water-soluble ethylene-based unsaturated monomer in which the acid group is not neutralized has higher solubility or miscibility with respect to a solvent (water) than a monomer in which an acid group is neutralized, and thus, is not precipitated even at a low temperature, and accordingly, is advantageous in long-term polymerization at a low temperature. Accordingly, it is possible to stably form a polymer having a higher molecular weight and a uniform molecular weight distribution by performing long-term polymerization using the water-soluble ethylene-based unsaturated monomer in a state in which the acid group is not neutralized.

In addition, it is possible to form a polymer with a longer chain, so that an effect of reducing the content of extractable contents present in a uncross-linked state due to incomplete polymerization or cross-linking may be achieved, and accordingly, it is suitable to implement saturation absorption magnification, which is a novel parameter of the present disclosure described above, to be within a desired range.

In addition, as described above, if polymerization is first performed to form a polymer in a state in which an acid group of a monomer is not neutralized, and the polymer is neutralized, and then micronized in the presence of a surfactant, micronized in the presence of a surfactant and then polymerized, or micronized simultaneously with neutralizing an acid group present in the polymer, the surfactant is present in a large amount on the surface of the polymer to sufficiently serve to lower the adhesiveness of the polymer.

According to an aspect of the present disclosure, the step of performing polymerization on the monomer composition to form a polymer may be performed for 1 hour or more in a batch-type reactor.

In a typical method for preparing a super absorbent polymer, the polymerization method is largely divided into thermal polymerization and photopolymerization depending on a polymerization energy source, and typically, the thermal polymerization may be performed in a reactor with a stirring shaft such as a kneader, and the photopolymerization may be performed in a flat-bottomed vessel.

Meanwhile, if the polymerization is performed as continuous polymerization, for example, if polymerization is performed in a reactor having a conveyor belt, a new monomer composition is supplied to the reactor as a polymerization product moves, thereby achieving polymerization in a continuous manner, so that polymers having different polymerization rates are mixed, and accordingly, it is difficult to achieve even polymerization in the entire monomer composition, which may cause degradation in the overall physical properties.

However, according to an aspect of the present disclosure, polymerization is performed in a stationary manner in a batch reactor, so that there is less risk of mixing polymers with different polymerization rates, and accordingly, a polymer having uniform quality may be obtained.

In addition, the above-described polymerization step is performed in a batch reactor having a predetermined volume, and performs a polymerization reaction for a long period of time, for example, 1 hour or more, 3 hours or more, or 6 hours or more, compared to a case in which polymerization is performed in a continuous manner in a reactor having a conveyor belt. Despite the long polymerization reaction time as described above, since polymerization is performed on a water-soluble ethylene-based unsaturated monomer in an unneutralized state, the monomer is not easily precipitated even when the polymerization is performed for a long period of time, and therefore, it is advantageous for long-term polymerization.

Meanwhile, the polymerization in a batch reactor of the present disclosure is performed by a thermal polymerization method, so that a thermal polymerization initiator is used as the polymerization initiator, and the description of the corresponding component is the same as described above.

Steps 2 and 3: Micronization and Neutralization Steps

Next, a step of micronizing the hydrogel polymer in the presence of a surfactant to prepare a mixture including the micronized hydrogel polymer (Step 2) is included.

The above-described micronization step is a step of micronizing the polymer in the presence of a surfactant, and is a step in which micronization and aggregation of the polymer into a size of tens to hundreds of micrometers are simultaneously performed, rather than chopping the polymer to a millimeter size.

That is, it is a step of imparting appropriate adhesiveness to the polymer, thereby preparing secondary aggregated particles in the shape in which primary particles micronized to a size of tens to hundreds of micrometers are aggregated. Hydrous super absorbent polymer particles, which are the secondary aggregated particles prepared in the above-described step have a normal particle size distribution and a greatly increased surface area, so that the absorption rate may be significantly improved.

Meanwhile, if ultra-fine pulverization is performed at a rotation speed of 500 rpm to 4,000 rpm by applying high-intensity mechanical shearing force in the micronization step, it is possible to form aggregated hydrogel particles having finer micropores.

At this time, if ultra-fine pulverization is performed at a rotation speed of 500 rpm to 4,000 rpm, high-intensity mechanical shearing force is applied, so that micropores of 100 μm or less are easily formed on the polymer, and accordingly, the surface roughness is increased, and the total surface area of the polymer is significantly increased by the pores formed inside and outside the polymer particles. Since the micropores are formed in a shape having stability compared to pores formed using a foaming agent in the polymerization step, the degree of fine powder generation due to the corresponding pores may be significantly reduced in the following process. Super absorbent polymer particles prepared in the above-described step have a significantly increased surface area, so that the vortex time may be significantly improved, and accordingly, it is suitable to implement the factor values F1 and F2 representing the relationship between the centrifuge retention capacity (CRC), the aspect ratio (A/R), the convexity, and the circularity of the present disclosure described above to be within desired ranges.

The ultra-fine pulverization process is performed at a rotation speed of 500 rpm to 4,000 rpm, and if the rotation speed of the above-described process is less than 500 rpm, it is difficult to form sufficient pores to a desired degree, so that it is difficult to expect quick vortex time, and it is difficult to secure a desired level of productivity. In addition, if the rotation speed is greater than 4,000 rpm, polymer chains may be damaged due to excessive shearing force, and accordingly, the content of extractable contents is increased, so that overall physical properties of a prepared super absorbent polymer may be slightly degraded. For example, the ultra-fine pulverization process may be performed at 1,000 rpm to 3,500 rpm, or 2,000 rpm to 3,000 rpm. In the above-described range, it is easy to form desired micropores without any problem described above.

According to an aspect of the present disclosure, the micronization step is performed by a micronization device, and the micronization device may include a body part having a transfer space thereinside, in which a polymer is transferred, a screw member rotatably installed inside the transfer space to move a polymer, a drive motor providing a rotational driving force to the screw member, a cutter member installed in the body part and pulverizing the polymer, and a perforated plate discharging the polymer pulverized by the cutter member to the outside of the body part and having a plurality of holes.

At this time, the size of the hole provided in the perforated plate of the micronization device may be 1 mm to 25 mm, 5 mm to 20 mm, or 5 mm to 15 mm.

As described above, when the polymer mixed with the surfactant is micronized using the micronization device while controlling aggregation, a smaller particle size distribution is implemented, so that the following drying and pulverization processes may be performed under milder conditions, and accordingly, it is possible to improve the physical properties of the super absorbent polymer while preventing the generation of fine powder, and if the ultra-fine pulverization is performed, appropriate micropores are simultaneously formed on the surface of the polymer, so that absorption rate may be improved through the improvement in the surface area.

The micronization step may be performed one or more times, and for example, may be performed 1 time to 6 times, 1 time to 4 times, or 1 time to 3 times. The above-described step may be performed using a plurality of micronization devices, or may be performed using a single micronization device including a plurality of perforated plates and/or a plurality of cutter members, or some devices of the plurality of micronization devices may include a plurality of perforated plates and/or a plurality of cutter members.

According to an aspect of the present disclosure, a surfactant may be additionally used in the above-described micronization step, and accordingly, aggregation between polymer particles may be effectively controlled to lower the load of the device used in the pulverization process, so that productivity may be further improved.

For example, the surfactant may be a compound represented by Formula 2 below or a salt thereof, but the present disclosure is not limited thereto.

[Formula 2]

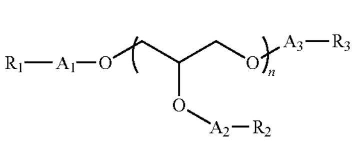

In Formula 2 above, $A_1$, $A_2$, and $A_3$ are each independently a single bond, carbonyl,

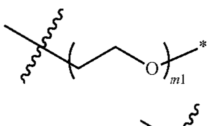, 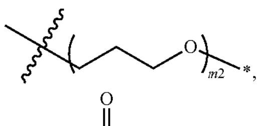, or

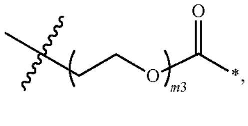, but one or more thereof is carbonyl or

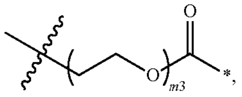

wherein m1, m2, and m3 are each independently an integer of 1 to 8,

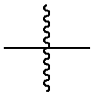

is connected to each of adjacent oxygen atoms, and  is connected to each of adjacent $R_1$, $R_2$, and $R_3$, $R_1$, $R_2$, and $R_3$ are each independently hydrogen, a linear-chain or branched-chain alkyl having 6 to 18 carbon atoms, or a linear-chain or branched-chain alkenyl having 6 to 18 carbon atoms, and n is an integer of 1 to 9.

The surfactant is mixed with the polymer and added such that the micronization step is facilitated without aggregation.

The surfactant represented by Formula 2 above is a nonionic surfactant, and has excellent surface adsorption performance by hydrogen binding force even with an unneutralized polymer, and thus, is suitable to implement a desired aggregation control effect. On the other hand, in the case of an anionic surfactant, not a nonionic surfactant, when mixed with a polymer neutralized with a neutralizing agent such as NaOH or $Na_2SO_4$, the anionic surfactant is adsorbed using $Na^+$ ions ionized in a carboxyl group substituent of the polymer as a medium, and when mixed with a unneutralized polymer, there is a problem in that the adsorption efficiency with respect to the polymer is relatively degraded due to competition with anions of a carboxyl group substituent of the polymer.

Specifically, in the surfactant represented by Formula 2 above, a hydrophobic functional group is a $R_1$, $R_2$, or $R_3$ part (if not hydrogen), which is a terminal functional group, and a hydrophilic functional group further includes a glycerol-derived part in the chain, and a hydroxyl group at the terminal (if $A_n$ is a single bond, and at the same time, $R_n$ is hydrogen, n=1 to 3), wherein the glycerol-derived part and the hydroxyl group at the terminal are hydrophilic functional groups, which serve to improve adsorption performance with respect to the polymer surface. Accordingly, it is possible to effectively suppress aggregation of super absorbent polymer particles.

In Formula 2 above, $R_1$, $R_2$, and $R_3$ parts (if not hydrogen), which are hydrophobic functional groups, are each independently a linear-chain or branched-chain alkyl having 6 to 18 carbon atoms, or a linear-chain or branched-chain alkenyl having 6 to 18 carbon atoms. At this time, if $R_1$, $R_2$, or $R_3$ part (if not hydrogen) is alkyl or alkenyl having less than 6 carbon atoms, there is a problem in that aggregation of pulverized particles is not effectively controlled due to a short chain length, and if $R_1$, $R_2$, or $R_3$ part (if not hydrogen) is alkyl or alkenyl having greater than 18 carbon atoms, the mobility of the surfactant is reduced, and thus, the surfactant may not be effectively mixed with the polymer, and due to an increase in the cost of the surfactant, there may be a problem in that the unit cost of the composition increases.

For example, $R_1$, $R_2$, or $R_3$ is hydrogen, or in the case of a linear-chain or branched-chain alkyl having 6 to 18 carbon atoms, it may be 2-methylhexyl, n-heptyl, 2-methylheptyl, n-octyl, n-nonyl, n-decanyl, n-undecanyl, n-dodecanyl, n-tridecanyl, n-tetradecanyl, n-pentadecanyl, n-hexadecanyl, n-heptadecanyl, or n-octadecanyl, or in the case of a linear-chain or branched-chain alkenyl having 6 to 18 carbon atoms, it may be 2-hexenyl, 2-heptenyl, 2-octenyl, 2-nonenyl, n-dekenyl, 2-undekenyl, 2-dodekenyl, 2-tridekenyl, 2-tetradekenyl, 2-pentadekenyl, 2-hexadekenyl, 2-heptadekenyl, or 2-octadekenyl.

The surfactant may be selected from compounds represented by Formula 2-1 to Formula 2-14 below.

[Formula 2-1]

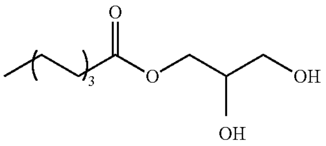

[Formula 2-2]

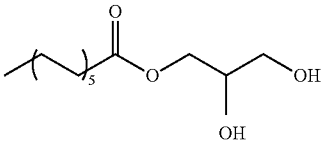

[Formula 2-3]

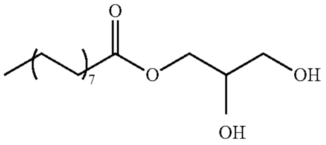

[Formula 2-4]

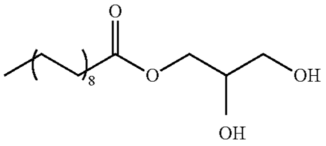

[Formula 2-5]

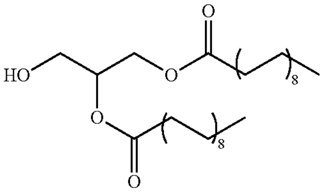

[Formula 2-6]

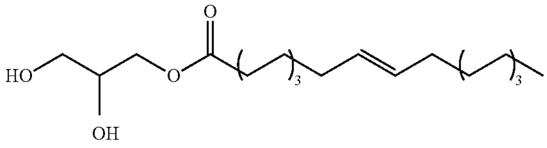

[Formula 2-7]

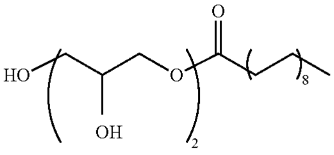

[Formula 2-8]

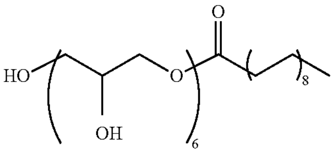

-continued

[Formula 2-9]

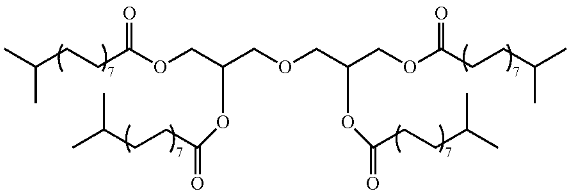

[Formula 2-10]

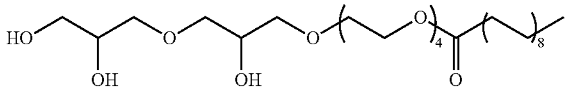

[Formula 2-11]

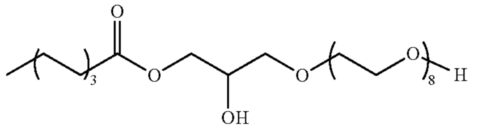

[Formula 2-12]

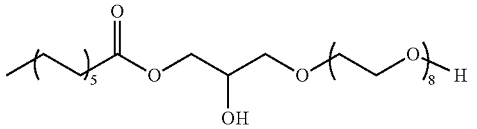

[Formula 2-13]

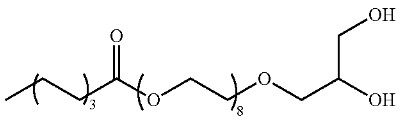

[Formula 2-14]

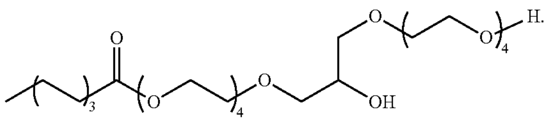

Meanwhile, the amount of the surfactant to be used is not particularly limited, but the surfactant may be used in an amount of 0.06 g to 0.48 g per 1,000 g of the hydrogel polymer depending on productivity securing or the load of a device.

If the surfactant is used too little, the surfactant is not evenly adsorbed onto the surface of the polymer, so that particles may re-aggregated after pulverization, or due to much sharing between the surfactant and the polymer, absorption performance such as centrifuge retention capacity and absorbency under pressure may be degraded. Meanwhile, if the surfactant is used too much, due to a decrease in surface tension, the overall physical properties of a finally prepared super absorbent polymer may be degraded.

Therefore, for example, the surfactant may be used in an amount of 0.06 g or more, 0.1 g or more, or 0.2 g or more, and 0.48 g or less, 0.45 g or less, or 0.4 g or less per 1,000 g of the hydrogel polymer, and accordingly, it is easy to control the circularity and the aspect ratio of the present disclosure described above to be within desired ranges.

A method for mixing a surfactant with a polymer is not particularly limited as long as it is a method capable of evenly mixing the surfactant with the polymer, and may be appropriately adopted and used. Specifically, the surfactant may be mixed in a dry manner, or dissolved in a solvent and then mixed in a solution state, or the surfactant may be melted and then mixed.

Among the above, the surfactant may be, for example, mixed in a solution state of being dissolved in a solvent. At this time, as the solvent, all types of solvents may be used whether it is an inorganic solvent or organic solvent, but considering the ease of a drying process and the cost of a solvent recovery system, water is most suitable. In addition, the solution may be prepared by mixing the surfactant and the polymer in a reaction tank, putting the polymer in a mixer and spraying the solution thereon, or mixing the polymer and the solution by continuously supplying the same to a continuously operating mixer.

Meanwhile, if the surfactant is mixed in a solution state of being dissolved in water, the surfactant may be diluted as an aqueous solution having a concentration of about 0.01% to 90% and used.

For example, if the surfactant is to be used in an amount of 0.1 g per 1,000 g of the hydrogel polymer, 100 g of an aqueous solution having a concentration of 0.1% may be used by dissolving 0.1 g of the surfactant in 99.9 g of water. Alternatively, 10 g of an aqueous solution having a concentration of 1% may be used by dissolving 0.1 g of the surfactant in 9.9 g of water.

That is, if the same amount of the surfactant is used, the water content may be adjusted to prepare an aqueous solution with a desired concentration, and the concentration may be appropriately adjusted in consideration of the physical properties of a super absorbent polymer to be finally prepared.

According to an aspect of the disclosure, a step of neutralizing at least a portion of the acid group of the polymer (Step 3) is performed, and the above-described micronization of Step 2 and the neutralization of Step 3 may be performed sequentially, alternately, or simultaneously.

That is, a neutralizing agent may be introduced to a polymer to polymerize the acid group first, and then a surfactant may be introduced to the polymerized polymer to micronize the polymer mixed with the surfactant (perform in the order of Step 3->Step 2), or a neutralizing agent and a surfactant may be simultaneously introduced to a polymer to neutralize and micronize the polymer (simultaneously perform Steps 2 and Step 3). Alternatively, a surfactant may be introduced first and then a neutralizing agent may be introduced later (perform in the order of Step 2->Step 3). Alternatively, a neutralizing agent and a surfactant may be alternately introduced. Alternatively, a surfactant may be introduced first for micronization, and then a neutralizing agent may be introduced for neutralization, and additionally, a surfactant may be further added to the neutralized hydrogel polymer to further perform the micronization process.

Here, if the neutralization is separately performed independently from the micronization of Step 2, the neutralization may be performed in such a manner that an additive is introduced while the polymer is being pulverized. More specifically, a screw-type extruder including a perforated plate having a plurality of holes may be used. The screw-type extruder is a device in which pulverization is performed in a mild condition compared to the micronization device used in the micronization step described above, and the rotation speed of the extruder may be about 150 rpm to about 500 rpm, and the hole of the perforated plate may be about 3 mm to 25 mm in size, but the present disclosure is not limited thereto.

The rotation speed of the screw-type extruder and the hole size of the perforated plate affect the discharge state of a super absorbent polymer discharged from the extruder, and depending on the discharge state, the particle shape of the super absorbent polymer may change.

Particularly, by adjusting the rotation speed of the screw-type extruder at 150 rpm to 500 rpm, it is possible to control the circularity and the aspect ratio of the present disclosure described above to be within desired ranges.

At this time, as the neutralizing agent, a basic material such as sodium hydroxide, potassium hydroxide, ammonium hydroxide, or the like, which is capable of neutralizing an acid group, may be used.

In addition, the degree of neutralization which refers to the degree of neutralization of an acid group included in the polymer by the neutralizing agent may be 50 mol % to 90 mol %, 60 mol % to 85 mol %, 65 mol % to 85 mol %, or 65 mol % to 80 mol %. The range of the degree of neutralization may vary depending on final physical properties, and by adjusting the degree of neutralization, it is possible to adjust absorption rate and absorption performance.

At this time, if the degree of neutralization is too high, the absorbency of the super absorbent polymer may decrease, and the concentration of the carboxyl group on the surface of the particle is too low, making it difficult to properly perform surface cross-linking in a subsequent process, so that absorption properties under pressure or permeability may be reduced. On the other hand, if the degree of neutralization is too low, the polymer may have significantly reduced absorption power, and may exhibit the same property as that of elastic rubber, which is difficult to handle.

Meanwhile, in order to neutralize the entire polymer evenly, a certain time lag may be left between the introduction of the neutralizing agent and the micronization process.

Step 4: Drying Step

Next, a step (Step 4) of drying the micronized and neutralized polymer to prepare base polymer powder is performed.

The above-described step is a step in which at least a portion of an acid group of a polymer is neutralized, and moisture of the base polymer powder, which is a polymer obtained by micronizing the polymer, is dried.

In a typical method for preparing a super absorbent polymer, the drying step is performed such that the moisture content of base polymer powder is to be about 4 wt % to 20 wt %, about 4 wt % to about 15 wt %, or about 6 wt % to about 13 wt %. However, the present disclosure is not limited thereto.

Step 4 above may be performed by fixed-bed type drying, moving type drying, or a combination thereof.

According to an aspect of the disclosure, Step 4 above may be performed by fixed-bed type drying.

The fixed-bed type drying refers to a method in which a material to be dried is suspended on a floor such as a perforated iron plate which allows air to pass through, and then hot air passes through the material from the bottom to the top to dry the material.

The fixed-bed type drying performs drying in a plate-shape manner without the flow of particles, so that it is difficult to achieve uniform drying with a simple flow of hot air. Therefore, the fixed-bed type drying requires a delicate adjustment of hot air and temperature in order to obtain a dried body with a uniform high moisture content. In the present disclosure, through a method for changing the direction of hot air from downward to upward, a plate-shaped dried body is prevented from bending during drying, thereby preventing the hot air from escaping. In addition, the drying temperature was changed for each section to adjust the upper layer-middle layer-lower layer inside the dried body to be uniformly dried with a moisture content deviation of 5% or less.

As a device capable of performing drying by the fixed-bed type drying, a belt-type dryer or the like may be used, but the present disclosure is not limited thereto.

In the case of the fixed-bed type drying step, the drying process may be performed at a temperature of about 80° C. to about 200° C., 90° C. to 190° C., or 100° C. to 180° C. If the drying temperature is below 80° C., the drying time may become excessively long, and if the drying temperature is excessively high, which is above 200° C., a super absorbent polymer having a moisture content lower than a desired moisture content may be obtained. Meanwhile, the drying temperature may mean the temperature of hot air which is used or the internal temperature of a device during the drying process.

According to an aspect of the present disclosure, Step 4 above may be performed by moving type drying.

The moving type drying refers to a method for drying a dried body by mechanically stirring the same during drying. At this time, the direction in which hot air passes through a material may be the same as or different from the circulation direction of the material. Alternatively, the material may be dried by circulating inside a dryer and passing through a heat medium fluid (heat oil) from a separate pipe outside the dryer.

As a device capable of performing drying by the above-described moving type drying, a horizontal-type mixer, a rotary kiln, a paddle dryer, a steam tube dryer, a moving type drier commonly used, or the like may be used.

In the case of the moving type drying step, the drying process may be performed at a temperature of about 100° C. to about 300° C., 120° C. to 280° C., or 150° C. to 250° C. If the drying temperature is excessively low, which is below 100° C., the drying time may become excessively long, and if the drying temperature is excessively high, which is above 300° C., super absorbent polymer chains may be damaged, which may degrade the overall physical properties, and also, a super absorbent polymer having a moisture content lower than a desired water content may be obtained.

Step 5: Pulverization Step

Next, a step of pulverizing the dried base polymer powder is performed.

Specifically, the pulverization step may be performed by pulverizing the dry base polymer powder to have a particle size of normal particle level, i.e., a particle diameter of 150 μm to 850 μm.

A pulverizer to be used for the above-described purpose may specifically be a vertical pulverizer, a turbo cutter, a turbo grinder, a rotary cutter mill, a cutter mill, a disc mill, a shred crusher, a crusher, a chopper, a disc cutter, or the like, but is not limited to the above-described examples.

Alternatively, as the pulverizer, a pin mill, a hammer mill, a screw mill, a roll mill, a disc mill, a jog mill, or the like may be used, but the pulverizer is not limited to the above-described examples.

Meanwhile, in the preparation method of the present disclosure, super absorbent polymer particles having a small particle size distribution may be implemented in the micronization step compared to a typical chopping step, and since the moisture content is maintained relatively high after drying, even if pulverization is performed under mild conditions with relatively low pulverization power, a super absorbent polymer having a very high content of particles with a normal particle size of 50 μm to 850 μm may be obtained, and the fine powder generation rate may be greatly reduced.

The super absorbent polymer particles prepared as described above may include super absorbent polymer particles having a particle diameter of 150 μm to 850 μm, i.e., normal particles, in an amount of 80 wt % or greater, 85 wt % or greater, 89 wt % or greater, 90 wt % or greater, 92 wt % or greater, 93 wt % or greater, 94 wt % or greater, or 95 wt % or greater based on the total weight. The particle diameter of the above-described polymer particles may be measured according to the method of EDANA WSP 220.3 of the European Disposables and Nonwovens Association (EDANA) standards.

In addition, the super absorbent polymer particles may contain fine powder having a particle diameter of less than 150 μm in an amount of about 20 wt % or less, about 18 wt % or less, about 15 wt % or less, about 13 wt % or less, about 12 wt % or less, about 11 wt % or less, about 10 wt % or less, about 9 wt % or less, about 8 wt % or less, or about 5 wt % or less based on the total weight. This is in contrast to having fine powder in an amount of greater than about 20 wt % to about 30 wt % when a super absorbent polymer is prepared according to a typical preparation method.

Additive Introduction Step

Meanwhile, according to an aspect of the disclosure, prior to the drying step (Step 4), a step of introducing an additive to the micronized and neutralized polymer may be further included.

The process of introducing an additive is a process for improving physical properties by using an additional additive within a range in which a desired effect is not inhibited, and the type of the additive is not particularly limited, wherein, for example, a polymerization initiator for removing residual monomers, a permeability enhancer for improving absorption properties, a fine powder anti-caking agent for recirculating generated fine powder, a fluidity enhancer, an antioxidant, a neutralizing agent, a surfactant, and the like may be used, but the additive is not limited thereto.

The additive introduction step may be performed simultaneously with Step 2, simultaneously with Step 3, after Step 2 and Step 3, or in at least one of the above-described steps. The additive introduction step may be performed a plurality of times if necessary, and may also be performed one or more times in each step.

If the additive introduction step is separately performed independently from Step 2 and Step 3, that is, if performed after Step 2 and Step 3 and before Step 4, the additive introduction step may be performed in a manner in which an additive is introduced while the polymer is being pulverized.

The pulverization of Step 5 described above may be equally applied to the pulverization above, and in the pulverization step, an additive may be introduced once or a plurality of times and mixed with the polymer.

Classification Step

Next, after the step of pulverizing the base polymer powder (Step 5), a step of classifying the pulverized super absorbent polymer particles according to the particle diameter may be further included.

Surface Cross-Linking Step

In addition, a step of forming a surface cross-linked layer on at least a portion of the surface of the base polymer particle in the presence of a surface cross-linking agent after pulverizing (Step 5) and/or classifying the base polymer powder may be further included. By the above-described step, a cross-linked polymer included in the base polymer powder may be further cross-linked by means of the surface cross-linking agent, so that the surface cross-linked layer may be formed on at least a portion of the surface of the base polymer powder.

The same contents described above with reference to a surface cross-linking agent may be equally applied to the surface cross-linking agent.

In addition, there is no limitation on a method for mixing the surface cross-linking agent with the base polymer powder. For example, a method in which a composition including a surface cross-linking agent and base polymer powder is introduced into a reaction tank and mixed, a method in a surface cross-linking agent is sprayed on the composition, a method in which a polymer composition and a surface cross-linking agent are continuously supplied to a continuously operating mixer, and the like may be used.

When the surface cross-linking agent and the base polymer powder are mixed, water and methanol may be mixed together and additionally added thereto. If water and methanol are added, there is an advantage in that the surface cross-linking agent may be evenly dispersed in the polymer composition. At this time, the content of water and methanol added may be appropriately adjusted to induce even dispersion of the surface cross-linking agent, to prevent aggregation of the polymer composition, and to optimize the surface penetration depth of the cross-linking agent.

The surface cross-linking process may be performed at a temperature of about 80° C. to about 250° C. More specifically, the surface cross-linking process may be performed at a temperature of about 100° C. to about 220° C., or about 120° C. to about 200° C. for about 20 minutes to about 2 hours, or about 40 minutes to about 80 minutes. When the above-described surface cross-linking process conditions are satisfied, the surface of the super absorbent polymer particles are sufficiently cross-linked, so that the absorbency under pressure may increase.

The means for raising the temperature for the surface cross-linking reaction is not particularly limited.

A heat medium may be supplied, or a heat source may be directly supplied for heating. At this time, the types of the heat medium that can be used may include steam, hot air, and a heated fluid such as hot oil, but are not limited thereto, and the temperature of a supplied heat medium may be appropriately selected in consideration of the means of the heat medium, the temperature raising rate, and the temperature raising target temperature. Meanwhile, the heat source that can be directly supplied may include heating through electricity, or heating through gas, but is not limited to the above-described examples.

Post-Treatment Step

According to an aspect of the present disclosure, after the step of forming the surface cross-linked layer on at least a part of the surface of the base polymer powder, the method may be performed by further including any one or more steps among a cooling step of cooling the super absorbent polymer particles having the surface cross-linking layer formed thereon, an adding-water step of adding water to the super absorbent polymer particles having the surface cross-linked layer formed thereon, and a post-treatment step of introducing an additive to the super absorbent polymer particles having the surface cross-linked layer formed thereon. At this time, the cooling step, the adding-water step, and the post-treatment step may be performed sequentially or simultaneously.

In the adding-water step, water or salt water may be used, through which the amount of remnants generated may be controlled. The amount of water to be used may be appropriately adjusted in consideration of a desired moisture content of a final product, and for example, the water may be used in an amount of 0.1 wt % to 10 wt %, 0.5 wt % to 8 wt %, or 1 wt % to 5 wt % based on the absorbent polymer, but is not limited thereto.

In addition, after the adding-water step, an aging step may be further performed.

If salt water is used in the adding-water step, due to the conductivity of the salt water, the solution absorption rate relatively decreases, which allows the salt water to evenly spread during the aging step, thereby making it possible to achieve even absorption with respect to the absorbent polymer. In the aging step, a commonly used method may be applied without particular limitation, and for example, the aging step may be performed at 100° C. or lower, 80° C. or lower, or at 50° C. or lower for 10 minutes to 1 hour using a rotary stirring facility.

The additive introduced in the post-treatment step may be a surfactant, an inorganic salt, a permeability enhancer, an anti-caking agent, a fluidity enhancer, an antioxidant, and the like, but the present disclosure is not limited thereto. By selectively performing the cooling step, the adding-water step, and the post-treatment step, the moisture content of a final super absorbent polymer may be increased by controlling the generation of remnants, and a high-quality super absorbent polymer product may be prepared.

Hereinafter, through specific aspects of the present disclosure, actions and effects of the present disclosure will be described in more detail. However, these aspects are only presented as examples of the technical features of the present disclosure, and the scope of the present disclosure is not limited thereby.

EXAMPLES

Example 1

(Step 1: Polymer Preparation Step)

In a 5 L glass container equipped with a stirrer and a thermometer, 1500 g of acrylic acid, and as an internal cross-linking agent, 5.25 g of pentaerythritol triallyl ether (PETTAE), and 3404 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

100 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,000 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1138 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 4 g of water, 6 g of methanol, 0.15 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Example 2

(Step 1: Polymer Preparation Step)

In a 5 L glass container equipped with a stirrer and a thermometer, 1500 g of acrylic acid, and as an internal cross-linking agent, 4.5 g of pentaerythritol triallyl ether (PETTAE), and 3402 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

50 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,000 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1396 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 3.5 g of water, 6 g of methanol, 0.07 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Example 3

(Step 1: Polymer Preparation Step)

In a 5 L glass container equipped with a stirrer and a thermometer, 1500 g of acrylic acid, and as an internal cross-linking agent, 3.75 g of pentaerythritol triallyl ether (PETTAE), and 3400 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

100 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,000 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1383 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 4 g of water, 6 g of methanol, 0.07 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Example 4

(Step 1: Polymer Preparation Step)

In a 5 L glass container equipped with a stirrer and a thermometer, 1400 g of acrylic acid, and as an internal cross-linking agent, 4.9 g of pentaerythritol triallyl ether (PETTAE), and 3512 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 28.0 g of 0.3% hydrogen peroxide aqueous solution, 14.0 g of 1% ascorbic acid aqueous solution, and 42.0 g of 2% 2,2'-azobis-(2-amidinopropane) dihydrochloric acid aqueous solution were introduced thereinto, and at the same time, as a reducing agent, 21.0 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

279 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,000 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1319 g of 50% NaOH aqueous solution (Step 3: neutralization step) was introduced to neutralize a portion of an acid group of the polymer, and then 100 g of fine powder (additional additive introduction step) and 149 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 5 g of water, 6 g of methanol, 0.1 g of ethylene glycol diglycidyl ether (EJ-1030S), and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 1

(Step 1: Polymer Preparation Step)

In a 5 L glass container equipped with a stirrer and a thermometer, 1500 g of acrylic acid, and as an internal cross-linking agent, 5.25 g of pentaerythritol triallyl ether (PETTAE), and 3404 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

By using a high-speed rotating chopper (F-150/Karl Schnell Co.) mounted inside a cylindrical pulverizer, 5,000 g of the polymer obtained in Step 1 above was pushed into a perforated plate with a plurality of 10 mm holes at a rotation speed of 2,000 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1161 g of 50% NaOH aqueous solution (Step 3: neutralization step) was introduced to neutralize a portion of an acid group of the polymer, and then 100 g of fine powder (additional additive introduction step) and 165 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 5.5 g of water, 6 g of methanol, 0.15 g of ethylene glycol diglycidyl ether (EJ-1030S), and 0.3 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 2

(Step 1: Polymer Preparation Step)

In a 5 L glass container equipped with a stirrer and a thermometer, 1500 g of acrylic acid, and as an internal cross-linking agent, 5.25 g of pentaerythritol triallyl ether (PETTAE), and 3404 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

597 g of 0.45 wt % glycerol monolaurate (GML) aqueous solution was added to 5,000 g of the polymer obtained in Step 1 above. Thereafter, using a high-speed rotating chopper (F-150/Karl Schnell Co.) mounted inside a cylindrical pulverizer, the mixture was pushed into a perforated plate with a plurality of 10 mm holes at a rotation speed of 2,000 rpm to perform a micronization process.

Thereafter, using a screw-type extruder mounted inside the cylindrical pulverizer, a hydrogel polymer recovered was pushed three times into the perforated plate with a plurality of 10 mm holes at a rotation speed of 250 rpm to perform an additional pulverization process. For each stage of the above-described screw-type extruder, 1037 g of 50% NaOH aqueous solution (Step 3: neutralization step) was introduced to neutralize a portion of an acid group of the polymer, and then 100 g of fine powder (additional additive introduction step) and 150 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 5.5 g of water, 5 g of methanol, and 0.07 g of ethylene glycol diglycidyl ether (EJ-1030S) was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 3

(Step 1: Polymer Preparation Step)

In a 5 L glass container equipped with a stirrer and a thermometer, 1500 g of acrylic acid, and as an internal cross-linking agent, 3.75 g of pentaerythritol triallyl ether (PETTAE), and 3400 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

100 g of 0.45 wt % glycerol monolaurate (GML) aqueous solution was added to 5,000 g of the polymer obtained in Step 1 above. Thereafter, using a screw-type extruder mounted inside the cylindrical pulverizer, the hydrogel polymer was pushed three times into the perforated plate with a plurality of 10 mm holes at a rotation speed of 250 rpm to perform an additional pulverization process. For each stage of the above-described screw-type extruder, 1383 g of 50% NaOH aqueous solution (Step 3: neutralization step)

was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 3.5 g of water, 5 g of methanol, and 0.12 g of ethylene glycol diglycidyl ether (EJ-1030S) was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 4

(Step 1: Polymer Preparation Step)

In a 5 L glass container equipped with a stirrer and a thermometer, 1500 g of acrylic acid, and as an internal cross-linking agent, 3.0 g of pentaerythritol triallyl ether (PETTAE), and 3399 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 30.0 g of 0.3% hydrogen peroxide aqueous solution, 15.0 g of 1% ascorbic acid aqueous solution, and 45.0 g of 2% 2,2'-azobis-(2-amidinopropane) dihydrochloric acid aqueous solution were introduced thereinto, and at the same time, as a reducing agent, 22.5 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

100 g of 0.45 wt % glycerol monolaurate (GML) aqueous solution was added to 5,000 g of the polymer obtained in Step 1 above. Thereafter, using a screw-type extruder mounted inside the cylindrical pulverizer, the hydrogel polymer was pushed three times into the perforated plate with a plurality of 10 mm holes at a rotation speed of 250 rpm to perform an additional pulverization process. For each stage of the above-described screw-type extruder, 1140 g of 50% NaOH aqueous solution (Step 3: neutralization step) was introduced to neutralize a portion of an acid group of the polymer, and then 100 g of fine powder (additional additive introduction step) and 162 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 5 g of water, 6 g of methanol, 0.15 g of ethylene carbonate, and 0.38 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 185° C. for 50 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 5

(Step 1: Polymer Preparation Step)

In a 5 L glass container equipped with a stirrer and a thermometer, 1450 g of acrylic acid, and as an internal cross-linking agent, 3.63 g of pentaerythritol triallyl ether (PETTAE), and 3454 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 29.0 g of 0.3% hydrogen peroxide aqueous solution, 14.5 g of 1% ascorbic acid aqueous solution, and 43.5 g of 2% 2,2'-azobis-(2-amidinopropane) dihydrochloric acid aqueous solution were introduced thereinto, and at the same time, as a reducing agent, 21.75 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

96 g of 0.45 wt % glycerol monolaurate (GML) aqueous solution was added to 5,000 g of the polymer obtained in Step 1 above. Thereafter, using a screw-type extruder mounted inside the cylindrical pulverizer, the hydrogel polymer was pushed three times into the perforated plate with a plurality of 10 mm holes at a rotation speed of 250 rpm to perform an additional pulverization process. For each stage of the above-described screw-type extruder, 1417 g of 50% NaOH aqueous solution (Step 3: neutralization step) was introduced to neutralize a portion of an acid group of the polymer, and then 100 g of fine powder (additional additive introduction step) and 159 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™ MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 3.5 g of water, 5 g of methanol, and 0.1 g of ethylene glycol diglycidyl ether (EJ-1030S) was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 6

(Step 1: Polymer Preparation Step)

In a 5 L glass container equipped with a stirrer and a thermometer, 1400 g of acrylic acid, and as an internal cross-linking agent, 2.8 g of pentaerythritol triallyl ether (PETTAE), and 3506 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 28.0 g of 0.3% hydrogen peroxide aqueous solution, 14.0 g of 1% ascorbic acid aqueous solution, and 42.0 g of 2% 2,2'-azobis-(2-amidinopropane) dihydrochloric acid aqueous solution were introduced thereinto, and at the same time, as a reducing agent, 21.0 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

279 g of 0.45 wt % glycerol monolaurate (GML) aqueous solution was added to 5,000 g of the polymer obtained in Step 1 above. Thereafter, using a screw-type extruder mounted inside the cylindrical pulverizer, the hydrogel polymer was pushed three times into the perforated plate with a plurality of 10 mm holes at a rotation speed of 250 rpm to perform an additional pulverization process. For each stage of the above-described screw-type extruder, 1027 g of 50% NaOH aqueous solution (Step 3: neutralization step) was introduced to neutralize a portion of an acid group of the polymer, and then 100 g of fine powder (additional additive introduction step) and 149 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™, MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 3.5 g of water, 5 g of methanol, 0.15 g of ethylene carbonate, and 0.2 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 185° C. for 50 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Comparative Example 7

(Step 1: Polymer Preparation Step)

In a 5 L glass container equipped with a stirrer and a thermometer, 1400 g of acrylic acid, and as an internal cross-linking agent, 2.8 g of pentaerythritol triallyl ether (PETTAE), and 3506 g of water were stirred and mixed, and then reacted while the temperature was maintained at 5° C. Nitrogen was introduced into the glass container containing the mixture at 1,000 cc/min for 1 hour for substitution under nitrogen conditions. Next, as a polymerization initiator, 28.0 g of 0.3% hydrogen peroxide aqueous solution, 14.0 g of 1% ascorbic acid aqueous solution, and 42.0 g of 2% 2,2'-azobis-(2-amidinopropane) dihydrochloric acid aqueous solution were introduced thereinto, and at the same time, as a reducing agent, 21.0 g of 0.01% iron sulfate aqueous solution was added to initiate polymerization. After the temperature of the mixture reached 85° C., the mixture was subjected to polymerization at 90±2° C. for about 6 hours to obtain a polymer.

(Steps 2 to 3: Micronization and Neutralization Steps)

279 g of 0.45 wt % glycerol monolaurate (GML) aqueous solution was added to 5,000 g of the polymer obtained in Step 1 above. Thereafter, using a screw-type extruder mounted inside the cylindrical pulverizer, the hydrogel polymer was pushed three times into the perforated plate with a plurality of 10 mm holes at a rotation speed of 250 rpm to perform an additional pulverization process. For each stage of the above-described screw-type extruder, 1027 g of 50% NaOH aqueous solution (Step 3: neutralization step) was introduced to neutralize a portion of an acid group of the polymer, and then 100 g of fine powder (additional additive introduction step) and 149 g of 10% $Na_2SO_4$ aqueous solution (additional additive introduction step) were each introduced to prepare hydrous super absorbent polymer particles (=micronized and neutralized polymer).

(Step 4: Drying Step)

1,000 g of the hydrous super absorbent polymer particles were introduced into a ventilated belt-type dryer including a perforated plate capable of transferring air volume up and down. In order for a dry super absorbent polymer to have a moisture content of about 10%, hot air of 200° C. and hot air of 100° C. were respectively allowed to flow from the top to the bottom for 5 minutes and 10 minutes sequentially, and then, the hot air of 100° C. was again allowed to flow from the bottom to the top for 15 minutes to dry the polymer uniformly.

(Step 5: Pulverization and Classification Step)

The dried body was pulverized using a pulverizer (GRAN-U-LIZER™ MPE), and then classified using a standard mesh sieve of the ASTM standards to obtain base polymer powder having a size of 150 μm to 850 μm.

(Surface Cross-Linking Step)

Next, per 100 g of the base polymer powder, a surface cross-linking agent aqueous solution containing 4.5 g of water, 5 g of methanol, 0.1 g of ethylene glycol diglycidyl ether (EJ-1030S), and 0.4 g of aluminum sulfate was sprayed and stirred at room temperature to be mixed such that the surface cross-linking solution was evenly distributed on the super absorbent polymer powder. Subsequently, the base polymer powder mixed with the surface cross-linking solution was put into a surface cross-linking reactor to be subjected to a surface cross-linking reaction. In the above-described surface cross-linking reactor, the base polymer powder underwent the surface cross-linking reaction at about 140° C. for 40 minutes to obtain a surface cross-linked super absorbent polymer.

After the above-described surface cross-linking step, the surface cross-linked super absorbent polymer was classified using a standard mesh sieve of ASTM standards to prepare a super absorbent polymer having a particle diameter of 150 μm to 850 μm.

Experimental Examples

The super absorbent polymers prepared in Examples and Comparative Examples were evaluated for physical properties by the following methods and the results are shown in Table 1 below.

Unless otherwise stated, the following evaluation of physical properties was all conducted at constant temperature/humidity (23±1° C., relative humidity 50±10%), and physiological saline or brine refers to 0.9 wt % sodium chloride (NaCl) aqueous solution.

A sample to be measured was left to stand under constant temperature/humidity conditions for 24 hours, and was evaluated for each physical property.

In addition, unless otherwise indicated, the evaluation of physical properties of a final super absorbent polymer was performed on a polymer having a particle diameter of 300 μm to 425 μm classified using a sieve of ASTM standards.

(1) Measurement of Shape of Super Absorbent Polymer Particles

For the super absorbent polymers of Examples and Comparative Examples, the aspect ratio (A/R), the convexity, and the circularity were measured by morphologi 4 of Malvern Panalytical Co., Ltd., in the following manner.

1) Preparation of sample: 1 g of a particle sample of a super absorbent polymer to be measured was prepared.

In order to measure the aspect ratio, the convexity, and the circularity for particles having a particle diameter of 100 μm to 600 μm, the super absorbent polymer was classified at 1.0 amplitude for 10 min by using a classifier of Retsch Company and separated into individual particles having a particle diameter of 100 μm to 600 μm without damage to the particles to prepare 1 g of the sample. At this time, setting values of a Sample Suspension Dispersion Unit are as shown in FIG. 1.

Figure 2:
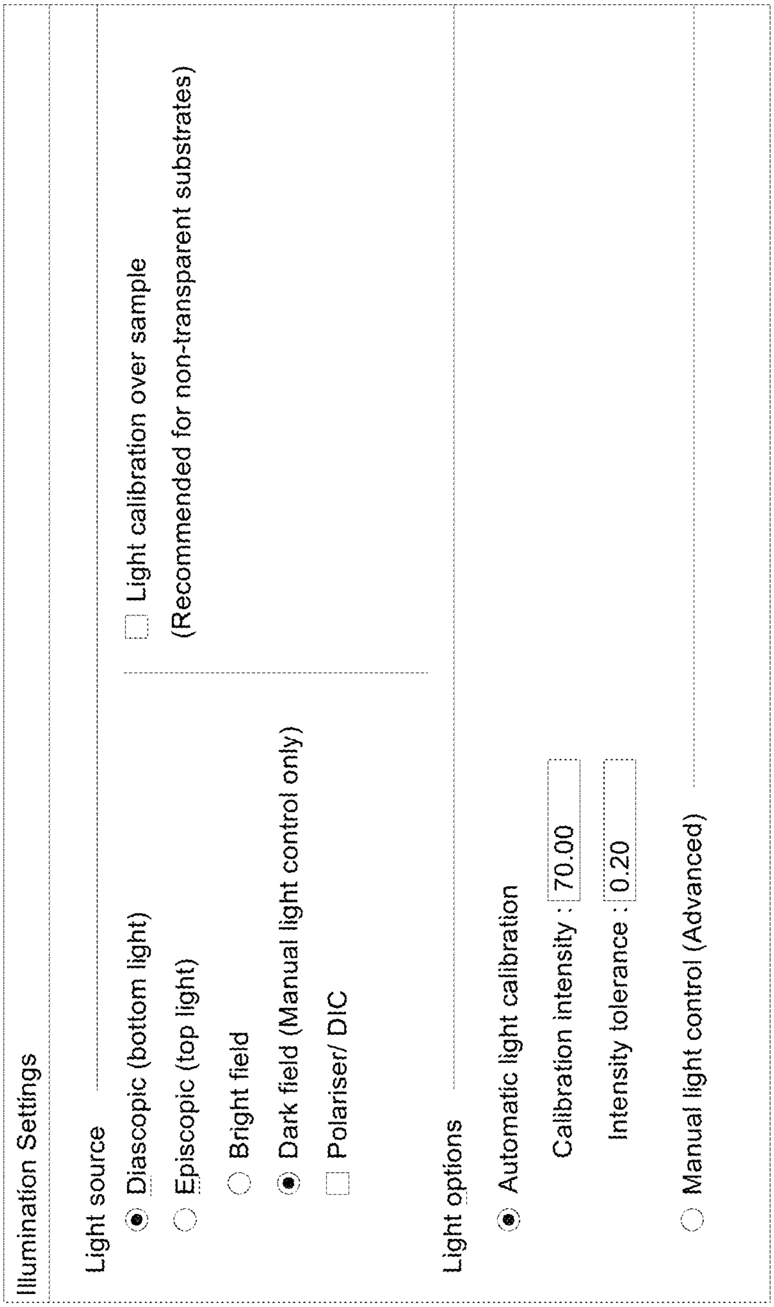
FIG. 2 shows Illumination setting values in morphologi 4 of Malvern Panalytical Co., Ltd.
Figure 3:
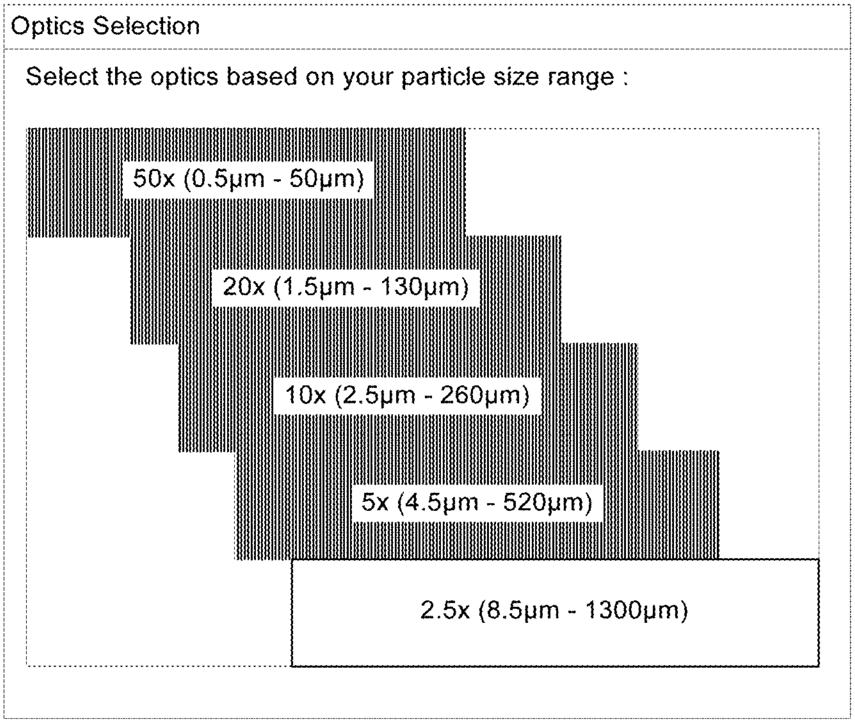
FIG. 3 shows Optics Selection setting values in morphologi 4 of Malvern Panalytical Co., Ltd.

2) Image acquisition: The prepared sample was set on a stage in an instrument, and then scanned at a magnification of 2.5 to obtain images of individual particles. At this time, illumination setting values and optics selection setting values are as shown in FIG. 2 and FIG. 3, respectively.

Figure 4:
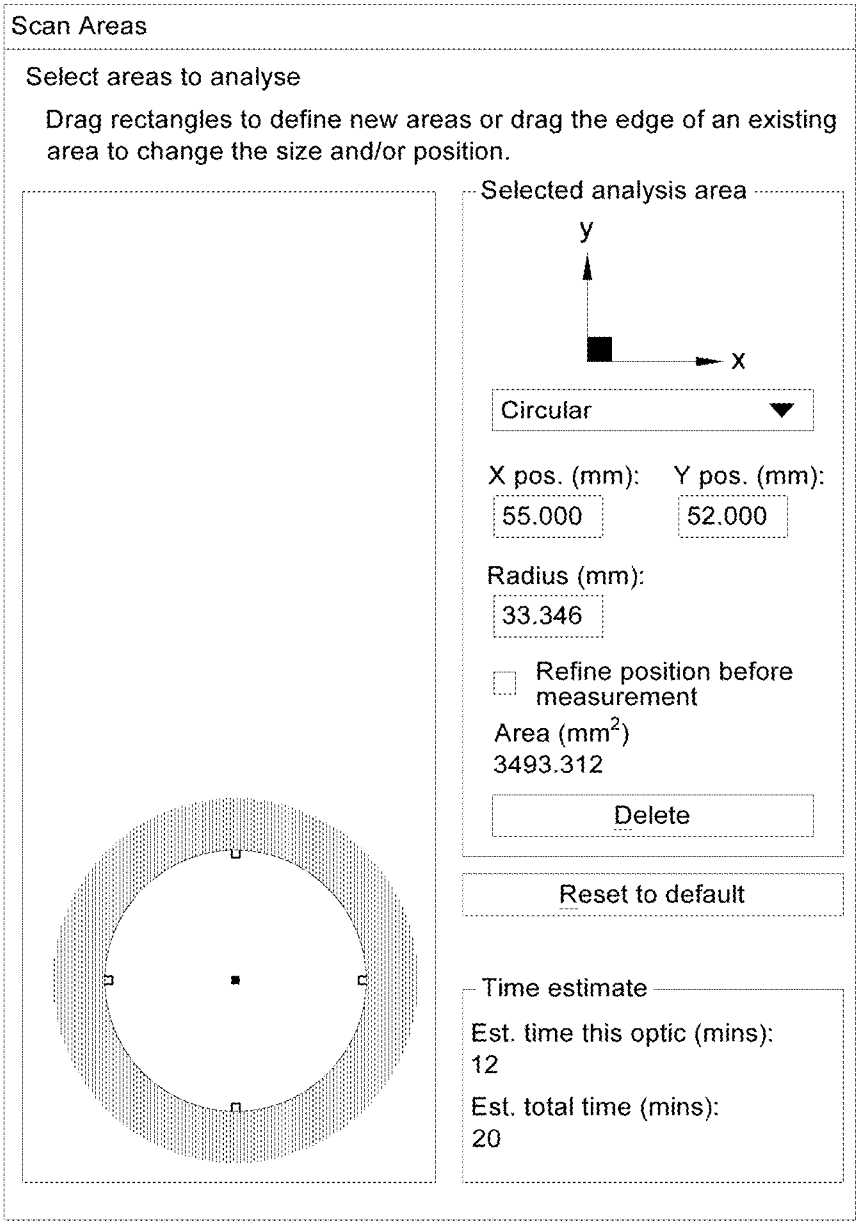
FIG. 4 shows Scan Area setting values in morphologi 4 of Malvern Panalytical Co., Ltd.

3) Image processing: For the acquired images, parameter values for each particle, such as an image captured as a 2D image of a 3-dimensional particle, a circle equivalent (CE) diameter, the shortest diameter, the longest diameter, an actual particle perimeter, a convex hull perimeter, and the like were measured. At this time, scan area setting values are as shown in FIG. 4, and the measurements were performed without setting filtering values for the particles.

4) Based on the data analyzed for each particle, a distribution diagram was derived for the parameters for all particles included in the sample.

TABLE 1

| | Aspect Ratio | Convexity | Circularity | CE Diameter (μm) |
|---|---|---|---|---|
| Example 1 | 0.741 | 0.885 | 0.779 | 445 |
| Example 2 | 0.785 | 0.878 | 0.791 | 404 |
| Example 3 | 0.724 | 0.864 | 0.746 | 461 |
| Example 4 | 0.745 | 0.895 | 0.821 | 430 |
| Comparative Example 1 | 0.764 | 0.921 | 0.821 | 397 |
| Comparative Example 2 | 0.720 | 0.919 | 0.810 | 443 |
| Comparative Example 3 | 0.718 | 0.915 | 0.799 | 460 |
| Comparative Example 4 | 0.734 | 0.941 | 0.836 | 442 |

TABLE 1-continued

| | Aspect Ratio | Convexity | Circularity | CE Diameter (μm) |
|---|---|---|---|---|
| Comparative Example 5 | 0.733 | 0.936 | 0.833 | 443 |
| Comparative Example 6 | 0.720 | 0.930 | 0.820 | 466 |
| Comparative Example 7 | 0.715 | 0.928 | 0.813 | 461 |

(2) Centrifuge Retention Capacity (CRC, g/g)

The centrifuge retention capacity of the super absorbent polymer of each of Examples and Comparative Examples by absorption magnification under no load was measured in accordance with the European Disposables and Nonwovens Association (EDANA) standard EDANA WSP 241.3.

In addition, the centrifuge retention capacity of a final super absorbent polymer was measured on a polymer having a particle diameter of 300 μm to 425 μm classified using a sieve of ASTM standards.

As described in the EDANA WSP 241.0, the measurement was performed at a temperature of 23±2° C. and a relative humidity of 45±15%.

Specifically, a super absorbent polymer $W_0$(g) (about 0.2 g) obtained through each of Examples and Comparative Examples was uniformly placed in a nonwoven fabric bag and sealed, and then immersed in physiological saline (0.9 wt %) at room temperature. After 30 minutes, the bag was drained for 3 minutes under the condition of 250 G using a centrifugal separator, and a weight $W_2$ (g) of the bag was measured. In addition, the same operation was performed without using a polymer, and then a weight $W_1$ (g) at that time was measured.

By using each obtained weight, the CRC (g/g) was calculated according to Equation 5 below.

$$CRC(g/g) = \{[W_2(g) - W_1(g)]/W_0(g)\} - 1 \quad \text{[Equation 5]}$$

The above-described measurement was repeated 5 times, and an average value and a standard deviation were obtained.

(3) Vortex Time

The vortex time of the reference super absorbent polymer of each of Examples and Comparative Examples was measured by the following method.

In addition, the vortex time of a final super absorbent polymer was measured on a polymer having a particle diameter of 300 μm to 425 μm classified using a sieve of ASTM standards.

1) First, 50 mL of 0.9% salt water was added to a 100 mL beaker having a flat bottom using a 100 mL mass cylinder.

2) Next, the beaker was placed in the center of a magnetic stirrer, and a circular magnetic bar (diameter 30 mm) was placed inside the beaker.

3) Thereafter, the stirrer was operated such that the magnetic bar was stirred at 600 rpm, and the lowest portion of a vortex generated by the stirring was brought into contact with the top of the magnetic bar.

4) After confirming that the temperature of the salt water in the beaker reached 24.0° C., 2±0.01 g of a super absorbent polymer sample was introduced thereinto and simultaneously, a stop watch was operated, and the time until the vortex disappeared and the surface of the liquid became completely horizontal was measured in seconds, which was set to vortex time.

(4) 1-Minute Absorbency in Water Having Electrical Conductivity Value of 110 μS/cm (110 μS/cm 1-Minute Absorbency)

The absorbency (g/g) in water having an electrical conductivity value of 110 μS/cm for a final super absorbent polymer was measured on a polymer having a particle diameter of 300 μm to 425 μm classified using a sieve of ASTM standards.

1.0 g ($W_3$) of each of the super absorbent polymers of Examples and Comparative Examples was placed in a nonwoven fabric bag (18 cm×28 cm) and immersed in 1000 mL of water having an electrical conductivity value of 110 μS/cm at 24° C. for 1 minute. After 1 minute, the bag was removed from the water having an electrical conductivity of 110 μS/cm, and then hung and left to stand for 1 minute. Thereafter, a weight $W_5$ of the envelope was measured. In addition, the same operation was performed without using a super absorbent polymer, and a weight $W_4$ at that time was measured. By using each weight obtained as described above, the 1-minute absorbency (g/g) in water having an electrical conductivity value of 110 μS/cm was calculated according to Equation 6 below.

$$\text{1-Minute absorbency in water having electric conductivity value of } 110\ \mu S/cm = \{[W_5(g) - W_4(g) - W_3(g)]/W_3(g)\} \quad \text{[Equation 6]}$$

TABLE 2

| | CRC (g/g) | Vortex (s) | 110 μS/cm 1 minute absorbency (g/g) |
|---|---|---|---|
| Example 1 | 30.8 | 30 | 135 |
| Example 2 | 31.4 | 20 | 167 |
| Example 3 | 36.6 | 27 | 142 |
| Example 4 | 34.6 | 33 | 218 |
| Comparative Example 1 | 29.8 | 38 | 105 |
| Comparative Example 2 | 30.9 | 44 | 89 |
| Comparative Example 3 | 37.5 | 58 | 88 |
| Comparative Example 4 | 39.7 | 79 | 56 |
| Comparative Example 5 | 40.1 | 61 | 75 |
| Comparative Example 6 | 40.8 | 84 | 58 |
| Comparative Example 7 | 44.8 | 70 | 58 |

(5) Calculation of Factor Value

The centrifuge retention capacity (CRC), the aspect ratio (A/R), the convexity, and the circularity which were derived above were substituted into Equation 1 and Equation 2 below to calculate factor values F1 and F2.

$$F1 = K1 \times [\{(A^{0.1} \times C \times D^{0.5})\}/(B^{0.3})] \quad \text{[Equation 1]}$$

$$F2 = K2 \times [(B^{0.2})/\{(A^{0.1} \times C \times D^{0.5})\}] \quad \text{[Equation 2]}$$

In Equation 1 and Equation 2 above, i) K1 and K2 are respectively correction constants of 0.5 and 0.8, ii) A is centrifuge retention capacity (CRC) measured according to a method of WSP 241.3 of the EDANA method for particles having a particle diameter of 300 μm to 425 μm, and iii) B, C and D are respectively average values of aspect ratio (A/R), convexity, and circularity for particles having a particle size of 100 μm to 600 μm.

TABLE 3

| | F1 | Vortex (s) | F2 | TWFA (g/g) |
|---|---|---|---|---|
| Example 1 | 0.602 | 30 | 0.685 | 135 |
| Example 2 | 0.593 | 20 | 0.692 | 167 |
| Example 3 | 0.589 | 27 | 0.701 | 142 |
| Example 4 | 0.631 | 33 | 0.653 | 115 |
| Comparative Example 1 | 0.635 | 38 | 0.647 | 105 |
| Comparative Example 2 | 0.643 | 44 | 0.643 | 89 |
| Comparative Example 3 | 0.649 | 58 | 0.637 | 88 |
| Comparative Example 4 | 0.682 | 79 | 0.605 | 56 |
| Comparative Example 5 | 0.678 | 61 | 0.608 | 75 |
| Comparative Example 6 | 0.673 | 84 | 0.614 | 58 |
| Comparative Example 7 | 0.677 | 70 | 0.611 | 58 |

Figure 5:
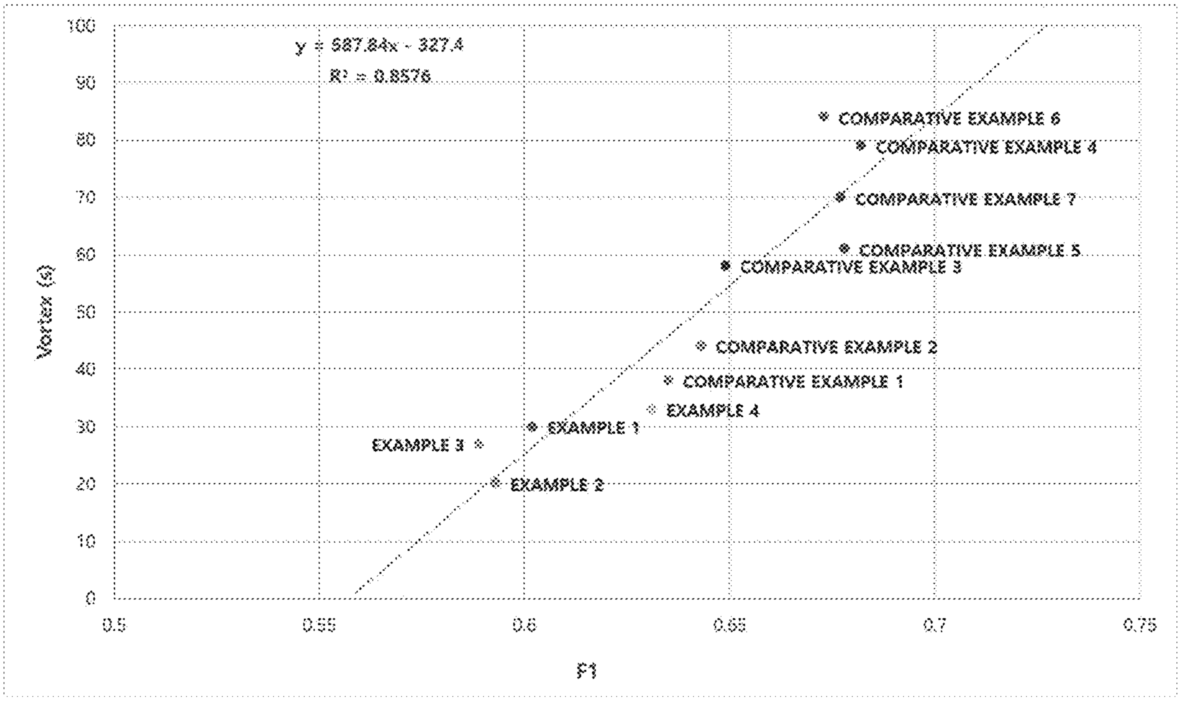
FIG. 5 is a graph showing a correlation between a factor value F1 and vortex time.
Figure 6:
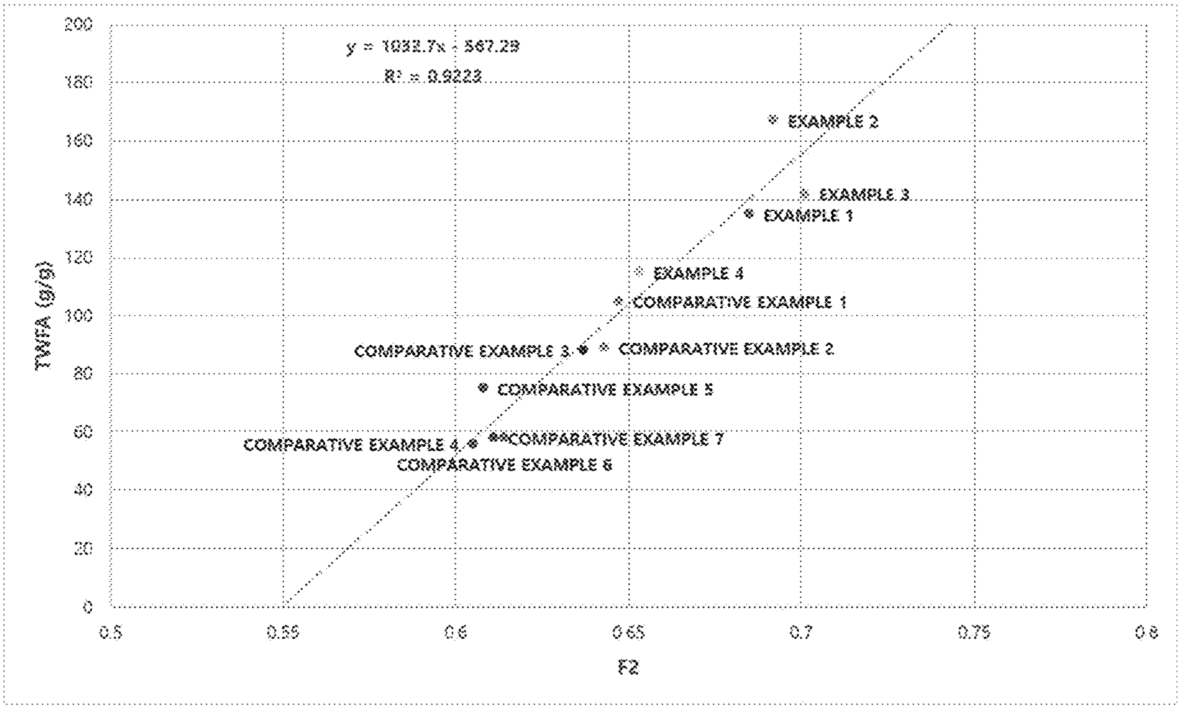
FIG. 6 is a graph showing a correlation between a factor value F2 and 1-minute absorbency in water having an electrical conductivity value of 110 μS/cm.

FIG. 5 is a graph showing a correlation between a factor value F1 and vortex time; and FIG. 6 is a graph showing a correlation between a factor value F2 and 1-minute absorbency in water having an electrical conductivity value of 110 μS/cm.

As can be confirmed in Table 3, FIG. 5, and FIG. 6 above, it can be seen that the factor value F1 of Equation 1 above is proportional to vortex time, and the factor value F2 of Equation 2 above is proportional to 1-minute absorbency in water having an electrical conductivity of 110 μS/cm.

Particularly, in the case of Examples 1 to 4 in which the F1 value satisfies 0.55 to 0.65, and the F2 value satisfies 0.65 to 0.75, it can be seen that the absorption rate is high and the absorption performance is also excellent.

That is, if the factor values F1 and F2, which represent the relationship between the centrifuge retention capacity (CRC), the aspect ratio (A/R), the convexity, and the circularity, are adjusted to predetermined values, it is possible to implement a super absorbent polymer having an excellent physical property balance by improving an absorption rate while simultaneously improving performance.

According to a super absorbent polymer of the present disclosure, it is possible to provide a super absorbent polymer capable of implementing excellent quality when the corresponding polymer is applied to an actual product by adjusting factor values F1 and F2, which represent the relationship between centrifuge retention capacity (CRC), aspect ratio (A/R), convexity, and circularity, to predetermined values.

Particularly, it is possible to provide a super absorbent polymer having an excellent physical property balance by improving vortex time while simultaneously improving absorption performance such as centrifuge retention capacity and absorbency under pressure.

In addition, when the above-described super absorbent polymer is applied to a hygiene product such as a diaper, the super absorbent polymer may absorb discharged body fluids at a high speed, and also in a relatively large amount, and thus, may prevent a problem such as accumulation of body fluids inside the hygiene product or leakage thereof to the outside.

That is, it is possible to provide a super absorbent polymer capable of quickly absorbing body fluids when applied to a product and retaining a large amount of body fluids without leaking the same to the outside.

Although the super absorbent polymer has been described with reference to the specific aspects, it is not limited thereto. Therefore, it will be readily understood by those skilled in the art that various modifications and changes can be made thereto without departing from the spirit and scope of the present disclosure defined by the appended claims.

What is claimed is:

1. A polyacrylic acid or salt thereof-based super absorbent polymer, wherein:

F1 calculated by Equation 1 is from 0.55 to 0.65,

F2 calculated by Equation 2 is from 0.65 to 0.75, and wherein a vortex time for particles having a particle diameter from 300 μm to 425 μm is less than 38 seconds, wherein the vortex time is measured according to a vortex measurement method at 24.0° C.:

$$F1=K1\times[(A^{0.1}\times C\times D^{0.5})/(B^{0.3})] \quad \text{[Equation 1]}$$

$$F2=K2\times[(B^{0.2})/\{(A^{0.1}\times C\times D^{0.5})\}] \quad \text{[Equation 2]}$$

wherein in Equation 1 and Equation 2:

K1 is a correction constant of 0.5,

K2 is a correction constant of 0.8,

A is a centrifuge retention capacity (CRC) for particles having a particle diameter from 300 μm to 425 μm, measured according to WSP 241.3 of the European Disposables and Nonwovens Association (EDANA), wherein the centrifuge retention capacity (CRC) for the particles having a particle diameter from 300 μm to 425 μm is 30 g/g or greater, B is an average value of an aspect ratio (A/R) for particles having a particle diameter from 100 μm to 600 μm, C is an average value of a convexity for particles having a particle diameter from 100 μm to 600 μm, and D is an average value of a circularity for particles having a particle diameter from 100 μm to 600 μm.

2. The super absorbent polymer of claim 1, wherein the F1 is from 0.57 to 0.64.

3. The super absorbent polymer of claim 1, wherein the F2 is from 0.65 to 0.72.

4. The super absorbent polymer of claim 1, wherein the centrifuge retention capacity (CRC) for the particles having a particle diameter from 300 μm to 425 μm is greater than 34 g/g.

5. The super absorbent polymer of claim 1, wherein the average value of the aspect ratio A/R for the particles having a particle diameter from 100 μm to 600 μm is from greater than or equal to 0.65 to less than 0.75.

6. The super absorbent polymer of claim 1, wherein the average value of the convexity for the particles having a particle diameter from 100 μm to 600 μm is from 0.80 to 0.94.

7. The super absorbent polymer of claim 1, wherein the average value of the circularity for the particles having a particle diameter from 100 μm to 600 μm is from 0.70 to 0.90.

8. The super absorbent polymer of claim 1, wherein when 1 g of the particles having a particle diameter from 300 μm to 425 μm is swollen for 1 minute with water having an electrical conductivity value of 110 μS/cm, a free swell capacity of the super absorbent polymer is 120 g or more.

* * * * *